US005809708A

United States Patent [19]

Greer et al.

[11] Patent Number: 5,809,708

[45] Date of Patent: *Sep. 22, 1998

[54] INTEGRATED PREFABRICATED FURNITURE SYSTEM FOR FITTING-OUT OPEN PLAN BUILDING SPACE

[75] Inventors: Ernest P. Greer, Grand Rapids, Mich.; Robert J. Luchetti, Cambridge, Mass.; David A. Shipman, Grand Rapids; Jack A. Tanis, E. Grand Rapids, both of Mich.; Gregg Robert Draudt, Watertown; Anne C. Ackerly, Cambridge, both of Mass.; Michael Tingley, Portland, Oreg.

[73] Assignee: Steelcase Inc., Grand Rapids, Mich.

[ * ] Notice: The term of this patent shall not extend beyond the expiration date of Pat. No. 5,784,843.

[21] Appl. No.: 450,253

[22] Filed: May 25, 1995

Related U.S. Application Data

[62] Division of Ser. No. 367,804, Dec. 30, 1994.

[51] Int. Cl.[6] .......... E04B 2/74

[52] U.S. Cl. .......... 52/220.7; 52/36.1; 52/36.4; 52/239; 160/196.1

[58] Field of Search .......... 52/220.7, 238.1, 52/239, 242, 79, 506.01, 506.04, 506.05, 506.06, 36.1, 79.4, 36.4; 160/135, 196.1, 200

[56] References Cited

U.S. PATENT DOCUMENTS

Re. 25,628 8/1964 Kruger .
2,121,213 7/1938 Small .

(List continued on next page.)

FOREIGN PATENT DOCUMENTS 581818 3/1989 Australia .
924472 4/1973 Canada .......... 52/238.1
8112517 12/1982 France .
714002 8/1954 United Kingdom .
1600990 10/1981 United Kingdom .

OTHER PUBLICATIONS

Progetto 25.90 by Unifor, Inc., U.S.A., Long Island City, New York (5 pages), date unknown—prior to Jan. 1, 1991.

Panneli PL by Unifor, Inc., U.S.A., Long Island City, New York, (35 pages), date unknown—prior to filing date of present application.

Knoll International—6" Power Panel by Knoll International, Inc., (16 pages), prior to Aug., 1990.

Teknion, Office Furniture Systems, 11 pages, copyright, 1982.

(List continued on next page.)

*Primary Examiner*—Michael Safavi
*Attorney, Agent, or Firm*—Price, Heneveld, Cooper, DeWitt & Litton

[57] ABSTRACT

An integrated prefabricated furniture is provided for finishing or fitting-out open plan building spaces, such as for offices, classrooms, hotels/motels, conference centers, medical treatment facilities, etc. A demountable architectural wall system covers the fixed walls of the building room, a portable partition wall system defines the interior space into individual work settings, and a demountable movable wall system forms custom width partitions. The three wall systems are completely compatible and fully integrated in both function and appearance, and provide similar utility raceways at common heights, as well as interchangeable cover panels. A modular column cover system selectively covers the support columns in the building room, and provides vertical utility routing and storage that integrates with the raceways in the wall systems. Pre-assembled facades, the freestanding storage case system, a space frame system, a prefabricated low raised floor construction, a modular overhead link head system, and accessories are disclosed and are designed to be used anywhere throughout the furniture system, and to serve to personalize the various individual work settings to accommodate specific users and tasks. Advantageously, the furniture system is readily reconfigurable.

35 Claims, 15 Drawing Sheets

U.S. PATENT DOCUMENTS

| | | | |
|---|---|---|---|
| 2,569,916 | 10/1951 | Barnes, Sr. et al. . | |
| 3,090,164 | 5/1963 | Nelsson . | |
| 3,180,459 | 4/1965 | Liskey, Jr. . | |
| 3,195,698 | 7/1965 | Codrea . | |
| 3,537,217 | 11/1970 | Lickliter et al. . | |
| 3,609,211 | 9/1971 | VanHerk . | |
| 3,655,961 | 4/1972 | Hover . | |
| 3,721,050 | 3/1973 | Perina | 52/506.06 X |
| 3,725,568 | 4/1973 | Stanley . | |
| 3,846,590 | 11/1974 | McLain . | |
| 3,848,385 | 11/1974 | Thompson . | |
| 3,927,498 | 12/1975 | Benedetti | 52/79.1 |
| 4,015,397 | 4/1977 | Flachbarth et al. . | |
| 4,218,579 | 8/1980 | Joly . | |
| 4,224,769 | 9/1980 | Ball et al. . | |
| 4,338,485 | 7/1982 | Fullenkamp et al. . | |
| 4,353,411 | 10/1982 | Harter et al. . | |
| 4,373,111 | 2/1983 | Myers et al. . | |
| 4,384,172 | 5/1983 | Knickerbocker et al. . | |
| 4,449,764 | 5/1984 | Hastings . | |
| 4,470,232 | 9/1984 | Condevaux et al. | 52/242 X |
| 4,535,577 | 8/1985 | Tenser et al. . | |
| 4,559,410 | 12/1985 | Hostetter . | |
| 4,567,698 | 2/1986 | Morrison . | |
| 4,567,699 | 2/1986 | McClellan . | |
| 4,625,633 | 12/1986 | Martin . | |
| 4,631,881 | 12/1986 | Charman . | |
| 4,646,211 | 2/1987 | Gallant et al. . | |
| 4,660,339 | 4/1987 | Paz . | |
| 4,685,255 | 8/1987 | Kelley . | |
| 4,765,111 | 8/1988 | Osawa . | |
| 4,771,583 | 9/1988 | Ball et al. . | |
| 4,795,355 | 1/1989 | Dorn et al. . | |
| 4,828,005 | 5/1989 | Notley . | |
| 4,841,699 | 6/1989 | Wilson et al. . | |
| 4,862,659 | 9/1989 | Wilson et al. . | |
| 4,874,027 | 10/1989 | Boundy et al. | 52/239 X |
| 4,874,322 | 10/1989 | Dola et al. . | |
| 4,876,835 | 10/1989 | Kelley et al. . | |
| 4,899,509 | 2/1990 | Power | 52/238.1 |
| 4,905,428 | 3/1990 | Sykes . | |
| 4,905,433 | 3/1990 | Miller . | |
| 4,942,805 | 7/1990 | Hellwig et al. . | |
| 4,944,122 | 7/1990 | Wendt . | |
| 4,986,330 | 1/1991 | McGonagle | 52/36.1 X |
| 5,025,603 | 6/1991 | Johnson . | |
| 5,027,041 | 6/1991 | Wills . | |
| 5,038,539 | 8/1991 | Kelley et al. . | |
| 5,054,255 | 10/1991 | Maninfior . | |
| 5,056,285 | 10/1991 | Frascaroli | 52/238.1 X |
| 5,062,246 | 11/1991 | Sykes . | |
| 5,065,556 | 11/1991 | DeLong et al. . | |
| 5,081,809 | 1/1992 | Thompson . | |
| 5,086,597 | 2/1992 | Kelley et al. . | |
| 5,142,832 | 9/1992 | Branham, Sr. et al. . | |
| 5,155,955 | 10/1992 | Ball et al. . | |
| 5,175,969 | 1/1993 | Knauf et al. . | |
| 5,177,917 | 1/1993 | del Castillo Von Haucke . | |
| 5,184,441 | 2/1993 | Balfanz, Jr. . | |
| 5,186,337 | 2/1993 | Foster et al. . | |
| 5,187,908 | 2/1993 | Losensky . | |
| 5,195,286 | 3/1993 | DeLong et al. . | |
| 5,197,246 | 3/1993 | Hill . | |
| 5,209,035 | 5/1993 | Hodges et al. . | |
| 5,214,889 | 6/1993 | Nienhuis et al. . | |
| 5,214,890 | 6/1993 | Levitan et al. . | |
| 5,216,579 | 6/1993 | Basara et al. . | |
| 5,241,796 | 9/1993 | Hellwig et al. . | |
| 5,263,290 | 11/1993 | Gardner . | |
| 5,277,005 | 1/1994 | Hellwig et al. . | |
| 5,277,006 | 1/1994 | Ruster . | |
| 5,277,007 | 1/1994 | Hellwig et al. . | |
| 5,282,341 | 2/1994 | Baloga et al. | 52/32 |
| 5,284,255 | 2/1994 | Foster et al. . | |
| 5,287,666 | 2/1994 | Frascaroli et al. . | |
| 5,309,686 | 5/1994 | Underwood et al. . | |
| 5,326,934 | 7/1994 | LeMaster et al. . | |
| 5,377,461 | 1/1995 | DeGrada et al. . | |
| 5,383,318 | 1/1995 | Kelley et al. . | |
| 5,394,658 | 3/1995 | Schreiner et al. . | |
| 5,406,760 | 4/1995 | Edwards . | |
| 5,431,210 | 7/1995 | Nelson et al. . | |
| 5,452,547 | 9/1995 | Baloga et al. | 52/32 |
| 5,483,776 | 1/1996 | Poppe | 52/220.3 |

OTHER PUBLICATIONS

Teknion, Price List Apr. 1983, 32 pages.

Teknion, 3 Reasons Why Teknion Could Change Your Mind About Office Furniture Systems, 17 pages, copyright 1983.

Leitner USA, Leitner_10, The Large–Scale System, 44 pages, date unknown, but at least as early as the filing date of the present application.

Leitner USA, Leitner_10, Planning Document, 93 pages, date unknown, but at least as early as the filing date of the present application.

Bosse, ManSpace Office Equipment, 20 pages, date unknown, but at least as early as the filing date of the present application.

Bosse, ManSpace, 10 pages, date unknown, but at least as early as the filing date of the present application.

Bosse, ManSpace Design Prof. Bitsch & Partner, 8 pages, date unknown, but at least as early as the filing date of the present application.

Office Specialty, Innovative Construction Sets Office Specialty's Platform Panel System Apart, 2 pages, dated Sep., 1995, but believed to be related to Edwards United States Patent 5,406,760.

INTEGRATED PREFABRICATED FURNITURE SYSTEM FOR FITTING-OUT OPEN PLAN BUILDING SPACE

CROSS-REFERENCES TO RELATED APPLICATIONS

This is a divisional of co-pending application Ser. No. 08/367,804, filed on Dec. 30, 1994.

The present application is related to the following, commonly assigned, co-pending United States patent applications which are hereby incorporated by reference.

| TITLE | SER. NO. | FILING DATE |
|---|---|---|
| Furniture Systems | 07/774,563 | 10-8-91 |
| Dynamic Workspace Module | 07/819,396 | 1-10-92 |
| Workspace Module | 08/145,073 | 10-29-93 |
| Utility Floor Construction | 08/063,500 | 5-18-93 |
| Utility Distribution System | 08/063,463 | 5-18-93 |
| Portable Partition System | 08/367,802 | 12-30-94 |

BACKGROUND OF THE INVENTION

The present invention relates to the finishing or fitting-out of building space and the like of the type having a generally open plan interior, and in particular to an integrated prefabricated furniture system therefor.

The finishing or fitting-out of building spaces for offices, medical treatment facilities, and other areas where work is conducted [similar uses] has become a very important aspect of effective space planning and layout. Work patterns, technology, and business organizations are constantly evolving and changing. The building space users require products which facilitate change at lower cost. Space planning is no longer a static problem. Changing technology and changing work processes demand that a design and installation be able to support and anticipate change.

These space planning challenges are driven largely by the fact that modern [offices] offering spaces are becoming increasingly more complicated and sophisticated due to increasing needs of the users for improved utilities support at each workstation or work setting. These "utilities," as the term is used herein, encompass all types of resources that may be used to support or service a worker, such as communications and data used with computers and other types of data processors, telecommunications, electronic displays, etc., electrical power, conditioned water, and physical accommodations, such as lighting, HVAC, sprinklers, sinage, security, sound masking, and the like. For example, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will need to be accommodated in the work places of the future.

The efficient use of building floor space is also an ever-growing concern, particularly as building costs continue to escalate. Open office plans have been developed to reduce overall office costs, and generally incorporate large, open floor spaces in buildings that are equipped with modular furniture systems, which are readily reconfigurable to accommodate the ever-changing needs of a specific user, as well as the divergent requirements of different tenants. One arrangement commonly used for furniture open plans includes movable partial height partition panels that are detachably interconnected to partition off the open spaces into individual work settings and/or offices. Such partition panels are configured to receive hang-on furniture units, such as worksurfaces, overhead cabinets, shelves, etc., and are generally known in the office furniture industry as "systems furniture." Another arrangement for dividing and/or partitioning open plans involves the use of modular furniture, in which a plurality of differently shaped, complementary freestanding furniture units are positioned in a side-by-side relationship, with upstanding privacy screens available to attach to selected furniture units to create individual, distinct work settings and/or offices. All of these types of modular furniture systems have been widely received due largely to their ability to be readily reconfigured and/or moved to a new site, since they are not part of a permanent leasehold improvement.

In order to gain increased efficiency in the use of expensive office real estate, attempts are now being made to try to support highly paid knowledge workers with these types of modular furniture systems in open office settings, instead of conventional private offices. However, in order to insure peak efficiency of such knowledge workers, the work settings must be equipped with the various state-of-the-art utilities and facilities discussed above. Since such work settings must be readily reconfigurable to effectively meet the ever-changing needs of the user, the distribution and control of utilities throughout a comprehensive open office plan has emerged as a major challenge to the office furniture industry. The inherent nature of modular furniture systems, which permits them to be readily reconfigurable into different arrangements, makes it very difficult to achieve adequate utility distribution and control.

Today's office workers need new flexible alternative products for the creation of individual and collaborative spaces which allow the expression of the cultural aims of the organization, express the creativity of the designer, provide a "sense of place" for the user, and provide a competitive edge for the developer. These needs include a full range of privacy options, from fully enclosed offices which support individual creative work to open spaces for collaborative team work. The products must also be able to accommodate diverse organizations, unique design signatures, and constantly changing work processes. Workers also need effective lighting, better air quality, life safety, and ergonomic task support to promote productivity, minimize the expenses of absenteeism and workman's compensation, and reduce potential liability, which collectively make the building more desirable to prospective clients.

Hence, utility distribution and control are fast becoming one of the major issues in office fit-out and furniture. Changing technology is creating greater demands on power and signal distribution networks. As businesses become more aware of the impact of proper ventilation and climate control on employee health and performance, HVAC is becoming more important as well. The current disposition of HVAC, lighting, and fire protection in the ceiling creates a separation between these services and the work settings below leading to inefficient and inaccurate systems. Routing power and signal distribution below the floor or in furniture systems often ends up in complex, idiosyncratic systems which are difficult to manage or change.

There is presently an oversupply of office space and furniture systems which do not properly respond to or support change. Many older buildings do not have adequate utility capabilities, and the cost of conventional renovations or improvements often renders the same impractical. Even relatively new buildings can be quickly rendered obsolete by the fast paced changes in modern technology. The refurbishing of existing building space is therefore a concern which must be addressed by furniture systems.

SUMMARY OF THE INVENTION

One aspect of the present invention is to provide an integrated prefabricated furniture system for fitting-out building space of the type having a generally open plan interior defined by fixed walls. A demountable architectural wall system covers the fixed walls of the associated building room, and includes a plurality of horizontally extending mounting channels which are attached to the fixed walls along upper and lower portions thereof. A plurality of horizontally extending belt zone utility troughs are attached to the fixed walls vertically inbetween the upper and lower portions thereof, adjacent to a predetermined worksurface height. A plurality of cover panels at least some of which are full width and have a horizontally elongated front elevational shape, are detachably attached to the mounting channels and the utility troughs to cover the fixed walls. A portable partition wall system spatially divides the interior of the room into individual workstations or work settings, and includes a plurality of freestanding panels detachably interconnected side-by-side. The panels have internal frames, at least some of which carry a horizontally extending utility raceway positioned adjacent worksurface height, and a plurality of cover panels, each of which has a horizontally elongated front elevational shape, and is detachably mounted on opposite sides of the frames to enclose the same. The belt zone utility troughs on the demountable architectural wall system, and the utility raceways on the portable partition zone wall system have a substantially equal width and are positioned at a common height to present a uniform horizontal appearance datum throughout the building room, and permit the continuous routing of utilities therethrough.

Preferably, the cover panels on the demountable architectural wall system and the portable partition wall panel system are substantially identical in size and shape to further reinforce the horizontal datum throughout the building room, and permit the same to be interchanged. A demountable movable wall system provides custom width partitions compatible with the demountable architectural wall system and the portable partition wall system. A modular column cover system is provided to selectively enclose support columns in the building room. Pre-assembled facades cooperate with the demountable architectural wall system, the portable partition wall system, as well as new or existing GWB walls, to form glass walls and entryways for the work settings. Pre-assembled freestanding storage cases compatible with the demountable architectural wall system and the portable partition wall system define storage for documents and the like and provide space partitioning. A space frame system is particularly adapted to support group work activities in the building interior, and includes utility raceways that cooperate with the raceways in the wall systems. A prefabricated low raised floor construction includes raceways which also cooperate with the raceways in the wall systems and space frame. A modular overhead link head system is supported from the building structure, and routes utilities therethrough to minimize fixed building wiring, plumbing, lighting, etc. A plurality of furniture accessories are provided to support the workers, and include connectors for interchangeably hanging the same from the demountable architectural wall system, the portable partition system, the demountable movable wall system, and the space frame system.

Another aspect of the present invention is to provide an integrated prefabricated furniture system for fitting-out a building room of the type having a generally open plan interior with an associated floor surface. A portable partition wall system spatially divides at least a portion of the open plan interior of the building room into a plurality of individual workstations or work settings, and includes a plurality of freestanding panels detachably interconnected side-by-side in a predetermined plan configuration. The panels have internal frames, at least some of which carry horizontally extending utility raceways positioned along an upper portion thereof. Cover panels having a horizontally elongated front elevational shape are detachably mounted on opposite sides of the frames to enclose the same. A space frame system supports group work activities in an open portion of the interior of the building room, and includes an overhead framework comprising a plurality of frame segments interconnected in an end-to-end fashion to form a rigid structure configured to be positioned above the floor surface. A plurality of support columns are connected with the overhead framework and support the same freestanding within the building room at a predetermined elevation above average user height. A plurality of individual panels are constructed to permit easy, manual, bodily translation of the same by an adult user, and include connectors that detachably mount the same on the overhead frame at various locations therealong in a manner in which the panels hang downwardly from the overhead support in a generally vertical orientation. The panels are readily and easily manually removable therefrom and reconfigurable thereon by the user. Utility raceways extend along the frame segments of the overhead framework, and communicate with the utility raceways on the portable partition wall panels to provide utilities throughout the furniture system.

Yet another aspect of the present invention is an integrated prefabricated furniture system for fitting-out a building room of the type having a generally open plan interior. A portable partition wall system spatially divides the open plan interior of the building room into a plurality of individual workstations or work settings, and includes a plurality of freestanding panels detachably interconnected side-by-side in a predetermined plan configuration. The panels have an internal frames, at least some of which contain horizontally extending utility raceways adjacent a predetermined worksurface height. A plurality of cover panels, having a horizontally elongated front elevational shape, are detachably mounted to opposite sides of the frames to enclose the same. A demountable movable wall system forms custom width partitions compatible with the portable partition wall system, and comprises a plurality of vertical studs positioned in a side-by-side relationship. A plurality of beltway channels are provided in different lengths to facilitate custom fabricating the partitions in different widths. The beltway channels are attached to the studs adjacent worksurface height to rigidly interconnect the same in a mutually parallel relationship, and permit the continuous routing of utilities therethrough with the utility raceways on the portable partition zone wall system. A plurality of cover panel detachably mount to the opposite sides of the studs to enclose the same.

The principal objects of the present invention are to provide a furniture system for finishing or fitting-out open plan building spaces that is completely prefabricated and fully integrated. A demountable architectural wall system covers the fixed walls of the building room, a portable partition wall system divides the interior space into individual and group work settings, and a demountable movable wall system forms custom width partitions. The three wall systems are completely compatible and fully integrated in both function and appearance, and provide similar utility raceways at common heights, as well as interchangeable cover panels. A modular cover column system selectively covers support columns in the building room, and provides vertical utility routing and storage that integrates with the raceways in the wall systems. Pre-assembled facades cooperate with the wall systems to create finished entryways for the work settings. A freestanding storage case system matches the wall systems for complete integration with the same, and serves as a space partition. A space frame system is particularly beneficial in supporting group work activities, and includes raceways which communicate with the wall system raceways to effectively and efficiently distribute utilities throughout the building room. A prefabricated low raised floor construction conforms with the various furniture elements to provide support for work settings where the walls are inappropriate and which require maximum facility capabilities. A modular overhead link head system is supported from the building ceiling, and routes utilities therethrough to minimize fixed building wiring, plumbing, lighting, etc. Furniture accessories, such as hang-on binder bins, shelves, paper managers, ambient and task lighting, displays, and the like are designed to be used anywhere throughout the furniture system. The furniture system is readily reconfigurable to meet the ever-changing needs of the user, and minimize permanent leasehold improvements.

The furniture system provides alternatives to the architectural built wall, and also provides better performance and a higher level of finish. Because it is a factory made product, the furniture system can provide a more precise, finer level of detailing and greater utility access, performance and flexibility at a lower cost than field built systems. The furniture system is also better adapted to accommodate more mature workers, who have greater need for privacy and utility distribution as well as higher expectations and more sophisticated tastes. The furniture system better supports facilities planning by introducing a logic and an order that is self-evidently rational from the user point of view, and supports, rather than contradicts, the distribution of services to make facility management and planning easier. The furniture system enables developers and businesses to facilitate change and create lower cost environments to support new work processes in all building types, even those that are outdated and/or underutilized. The furniture system allows user control over environment, so as to create healthier work areas, which reduces stress and absenteeism. The furniture system provides improved utility distribution at lower first-time costs, as well as greater flexibility in utilities with lower life cycle costs. The furniture system is designed to interface with all types of existing buildings and building systems, and is nearly completely reusable, as well as environmentally responsible. The furniture system provides a new range of design options through the introduction of horizontal datum, and a wide variety of detailing options. The furniture system also allows a full range of levels of privacy from open group workspaces to fully enclose, acoustically private offices. The furniture system is efficient to use, economical to manufacture, capable of a long operating life, and particularly well adapted for the proposed use.

These and other advantages of the invention will be further understood and appreciated by those skilled in the art by reference to the following written specification, claims, and appended drawings.

DETAILED DESCRIPTION OF THE PREFERRED EMBODIMENTS

Figure 1:
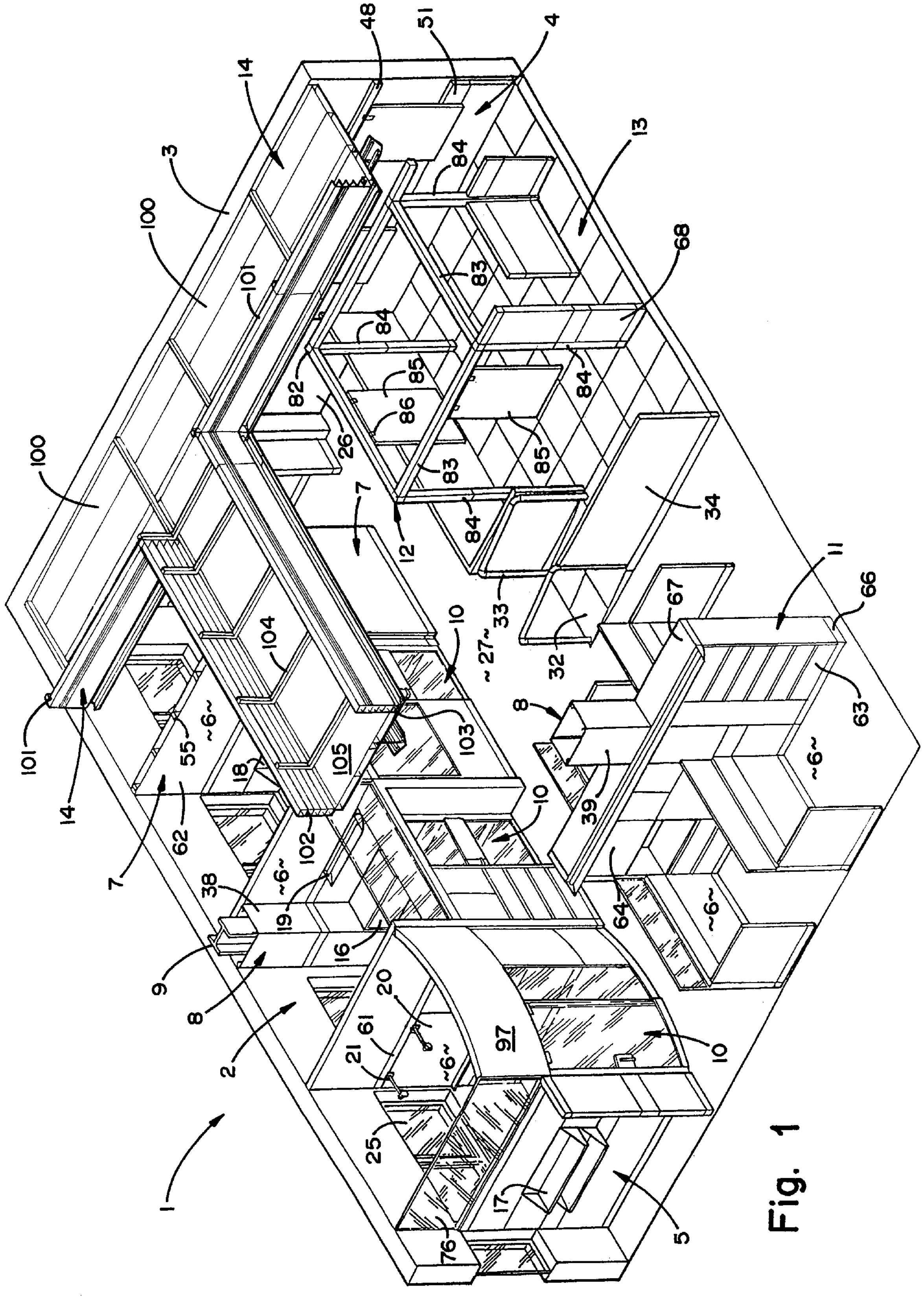
FIG. 1 is a perspective view of an integrated prefabricated furniture system embodying the present invention.

For purposes of description herein the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 1 (FIG. 1) generally designates an integrated prefabricated furniture system embodying the present invention. Furniture system 1 is particularly adapted for finishing or fitting-out building space, rooms, etc. 2 of the type having a generally open plan interior defined by fixed interior and exterior walls 3. Such building spaces 2 are typically designed for use as offices, facilities for education/training, hotels/motels, conference centers, medical treatment, and other similar purposes. A demountable architectural wall system 4 (Plus wall) covers the fixed walls 3 of building room 2, a portable partition wall system 5 (Zone wall) divides the interior space of the building room into individual workstations or work settings 6, and a demountable movable wall system 7 (Link wall) forms custom width partitions. The three wall systems 4, 5, and 7, which are shown individually in FIGS. 6, 2, and 7, respectively, are completely compatible and fully integrated in both function and appearance. A modular column cover system 8 selectively covers support columns 9 in building room 2, and provides vertical utility routing and storage that integrates with wall systems 4, 5, and 7. A pre-assembled facade system 10 cooperates with wall systems 4, 5, and 7 to create finished entryways for work settings 6. A free-standing case storage system 11 matches wall systems 4, 5, and 7 for complete integration with the same. A space frame system 12 is particularly beneficial in supporting group activities, and the like, and includes utility raceways which communicate with wall systems 4, 5, and 7 to effectively and efficiently distribute utilities throughout building room 2. A prefabricated low raised floor system 13 is supported directly on the floor of building room 2, and conforms with the various furniture elements to provide support for those work settings 6 requiring maximum utility capabilities. A modular overhead link head system 14 is supported from the building ceiling, and routes utilities therethrough to minimize fixed building wiring, plumbing, lighting, etc. Furniture accessories, such as hang-on binder bins 16, shelves 17, paper managers 18, task lighting 19, displays 20, etc. are designed to be used anywhere throughout furniture system 1. Furniture system 1 is readily reconfigurable to meet the ever-changing needs of the user, and minimize permanent leasehold improvements.

Figure 11:
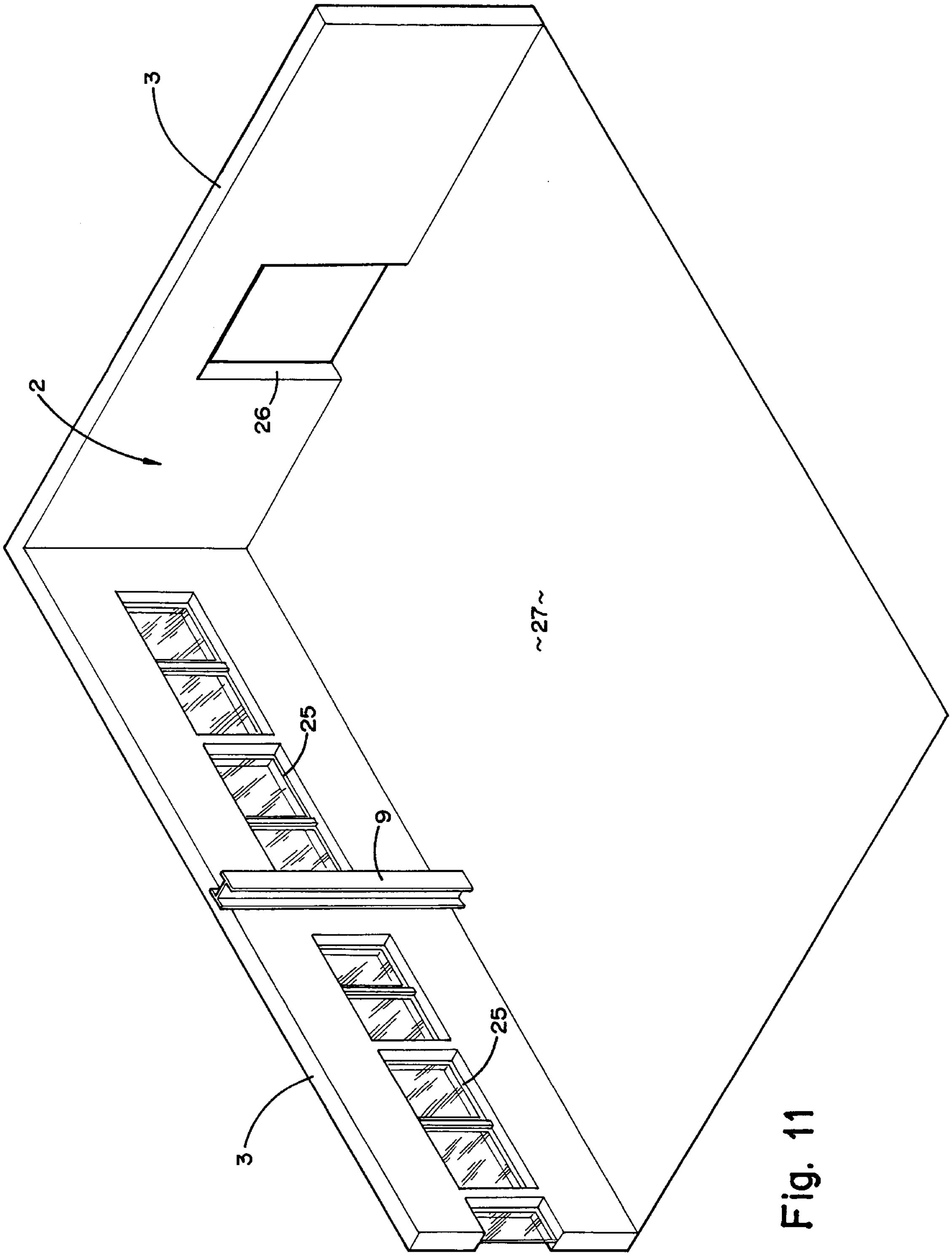
FIG. 11 is a perspective view of an unfinished building room of the type having an open plan interior defined by fixed walls, and including support columns.

The illustrated building room 2 (FIG. 11) is exemplary of typical new open office space, wherein fixed or demising walls 3 include windows 25, and entryway 26, as well as a floor surface 27. In the case of new construction, building room 2 is preferably a shell, left substantially unfinished, without any coverings on the interior of walls 3 or on floor 27, and without utilities, such as wiring, lighting, plumbing, HVAC, fire sprinklers, etc. being installed therein. In existing building structures, the current coverings can either be augmented, replaced or covered over by furniture system 1. As will be appreciated by those skilled in the art, furniture system 1 is particularly adapted to be used wherever work is conducted, including offices, residences, airports, etc.

Figure 12:
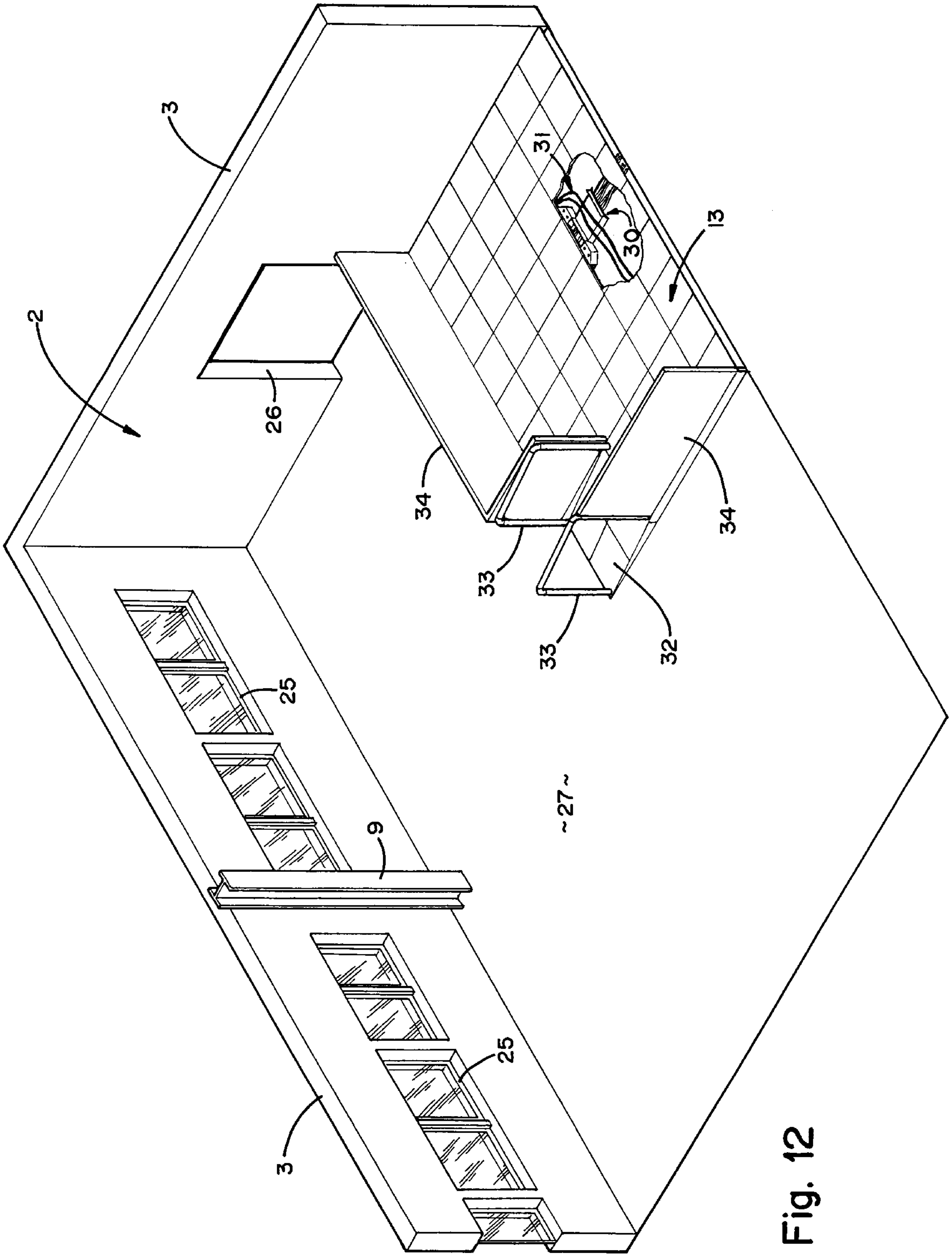
FIG. 12 is a perspective view of the building room, with the prefabricated floor system installed therein.

The illustrated raised floor system 12 (FIGS. 9 and 12) has a prefabricated construction, and is abuttingly supported directly on the floor surface 7 of building room 2. Although floor system 2 contemplates a wide variety of different constructions, preferably it has a thin-raised construction with a relatively low profile to facilitate easy ingress and egress from floor surface 27 of building room 2. Examples of suitable floor systems 12 are provided in commonly assigned, co-pending U.S. patent applications Ser. No. 08/063,500, filed May 18, 1993, entitled UTILITY FLOOR CONSTRUCTION, as well as Ser. No. 08/063,463, filed May 18, 1993, entitled UTILITY DISTRIBUTION SYSTEM, which have been incorporated herein by reference therein. Regardless of the specific construction of low raised floor system 13, it has a hollow interior with optional raceways 30 and 31 (FIG. 12) therethrough in which utilities are routed to their desired locations. In the illustrated example, floor raceways 30 and 31 isolate power wires from data and signal cables to alleviate interference therebetween. A ramp area 32 of floor system 13 facilitates ingress and egress between floor system 13 and the floor surface 27 of building room 2, while rails 33 and partitions 34 are provided about the open peripheral edges of floor system 12.

Figures 2, 3, 4, 5, 6, 7, 8, 9, 10:
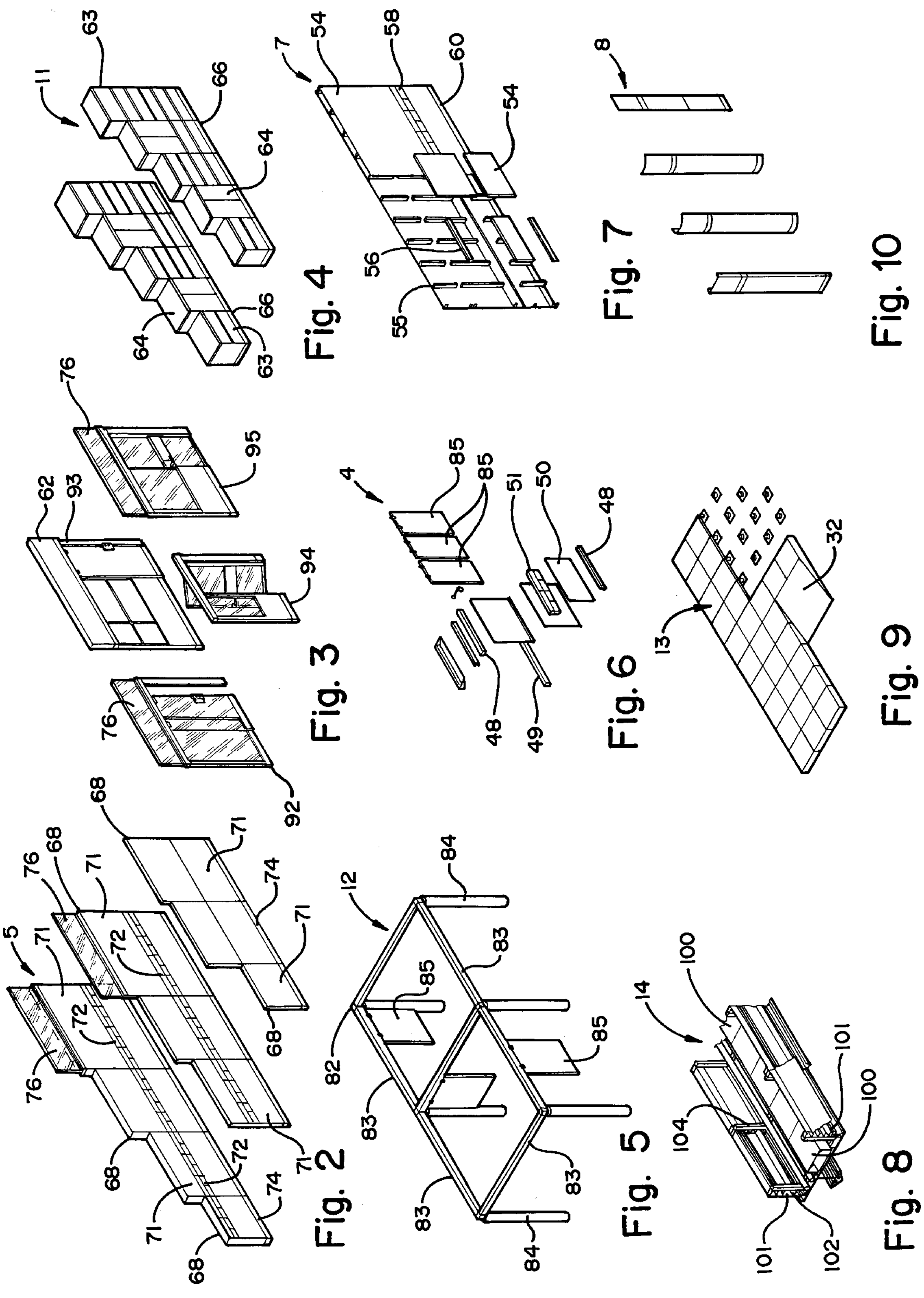
FIG. 2 is a perspective view of a portable partition wall system, which is part of the furniture system.
FIG. 3 is a perspective view of a pre-assembled facade system, which is part of the furniture system.
FIG. 4 is a perspective view of a freestanding storage case system, which is part of the furniture system.
FIG. 5 is perspective view of a space frame system to support group and individual activities in an open plan, which is part of the furniture system.
FIG. 6 is an exploded, perspective view of a demountable architectural wall system, which is part of the furniture system.
FIG. 7 is an exploded, perspective view of a demountable movable wall system, which is part of the furniture system.
FIG. 8 is a perspective view of a modular overhead link head system, which is part of the furniture system.
FIG. 9 is a perspective view of a prefabricated low raised floor system, which is part of the furniture system.
FIG. 10 is a perspective view of a modular column cover system, which is part of the furniture system.
Figure 13:
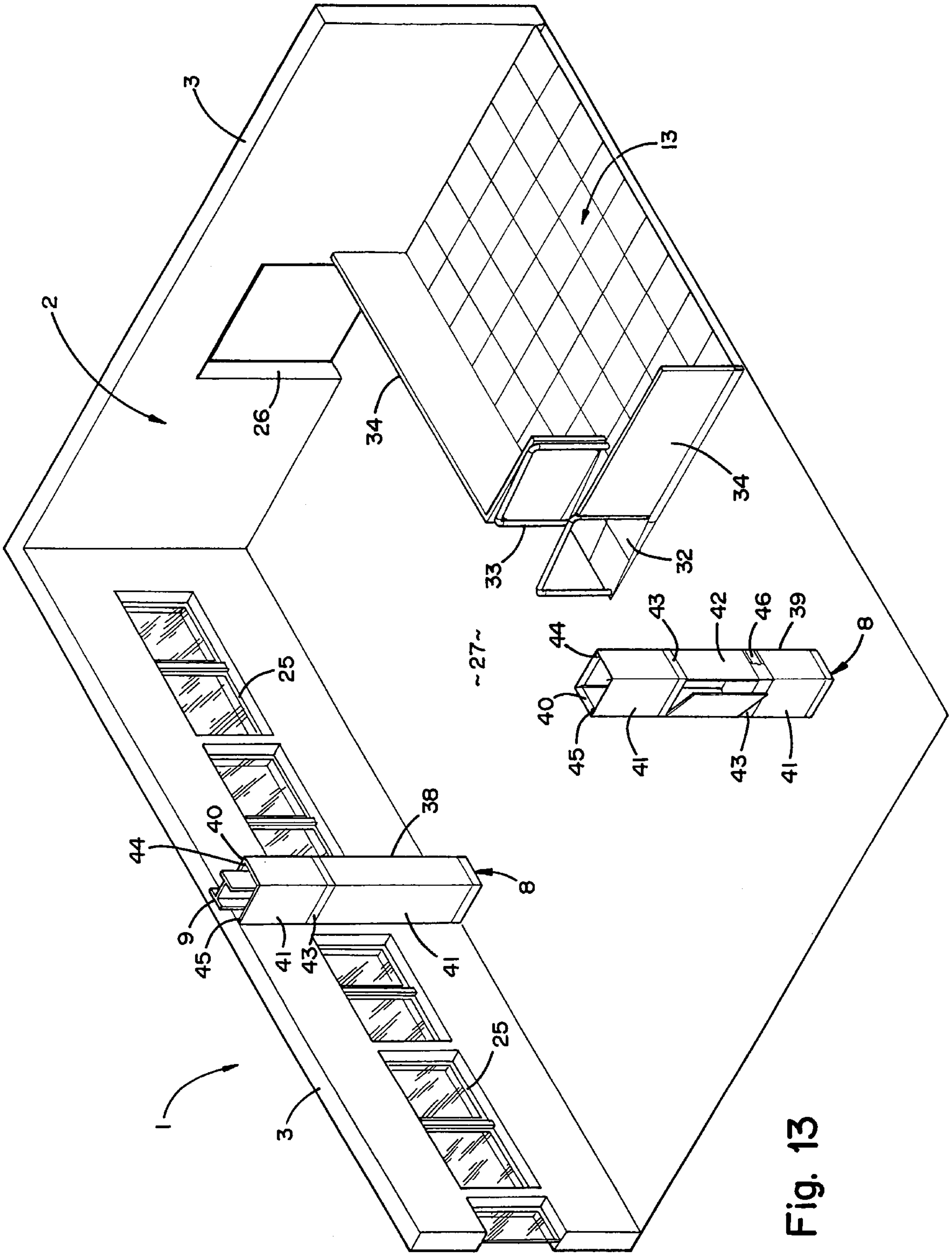
FIG. 13 is a perspective view of the building room and furniture system shown in FIG. 12, and wherein the modular column cover system is installed therein.

The illustrated column cover system 8 (FIG. 13) is designed to selectively enclose the building support columns 9, as in column cover unit 38, or form freestanding utility cabinets, as in column cover unit 39. Both column cover units 38 and 39 have a substantially identical construction, wherein each includes an internal framework 40 on which removable cover panels 41–43 are mounted to enclose the same. Column cover units 38 and 39 have a top plan shape and configuration which is substantially larger than that of the associated building columns 9, so as to provide space between the same in which vertical corner raceways 44 and 45 are formed. The space between column cover unit 38 and an associated building column 9 also permits adjusting the distance between fixed building structures to accommodate regular wall panel widths, as described in greater detail below. The column cover units 38 and 39 may also be equipped with horizontal raceways 43 disposed immediately behind one or more of the narrow cover panels 43. In the cabinet style cover unit 39, one or more of the larger cover panels 41 and 43 may be hingedly mounted on the associated internal framework 40 to provide easy access to the interior of the same. Cabinet style column cover unit 39 may be used to store electronic equipment, such as telephone switches, and the like. As shown in FIG. 10, cover panels 42–43 can be provided in a variety of different styles and shapes to coordinate or match with the decor of furniture system 1.

Figure 14:
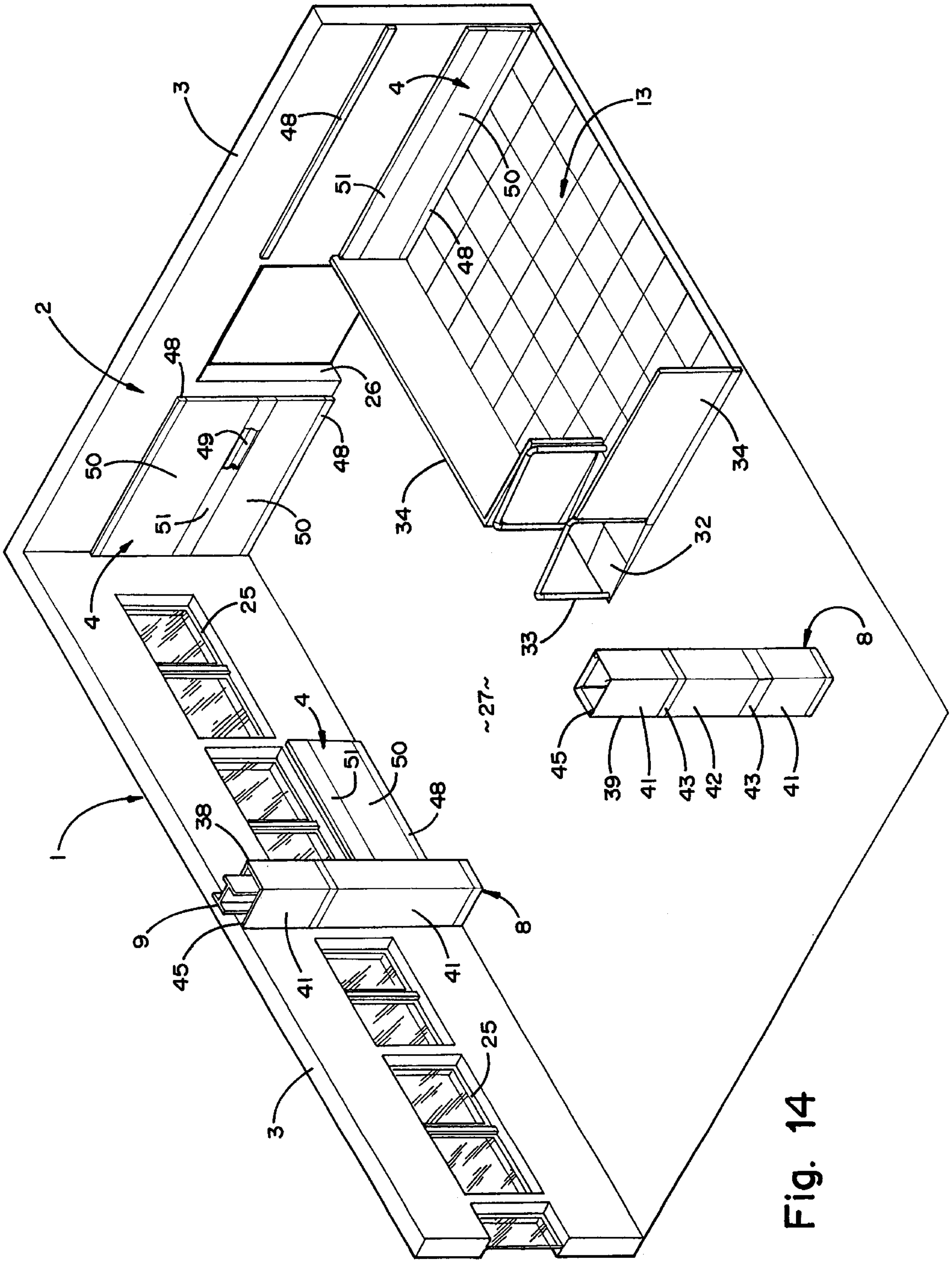
FIG. 14 is a perspective view of the building room and furniture system shown in FIG. 13, and wherein the demountable architectural wall system is installed therein.

The illustrated prefabricated wall system 4 (FIG. 14), which is also referred to herein as the Plus wall system, is a demountable architectural wall system that is particularly designed for covering the fixed walls 3 of building room 2. Plus wall system 4 includes a plurality of horizontally extending mounting channels 48 which are attached to the fixed walls 3 of building room 2 along upper and lower portions thereof. A plurality of horizontally extending belt zone utility troughs 49 are also provided for attachment to the building room fixed walls 3 at a position vertically between the upper and lower portions thereof, adjacent to standard worksurface height. A plurality of cover panels 50–51 are provided, at least some of which are full width, and have a horizontally elongated front elevational shape. Cover panels 50–51 are detachably mounted on the mounting channels 48 and utility troughs 49 to thereby cover the fixed walls 3. Preferably, mounting channels 48 include a hanger channel on which at least some of the furniture accessories may be supported, including hanging panels, ambient and task lighting, as well as hang-on storage with the use of additive support rails (not shown). The illustrated Plus wall system has both full and partial height segments. In general, Plus wall system 4 is a system of additive architectural wall elements for adding utility and upgrading finish to existing walls. Half columns (not shown) may also be provided for vertical utility distribution along the wall surface.

Figure 15:
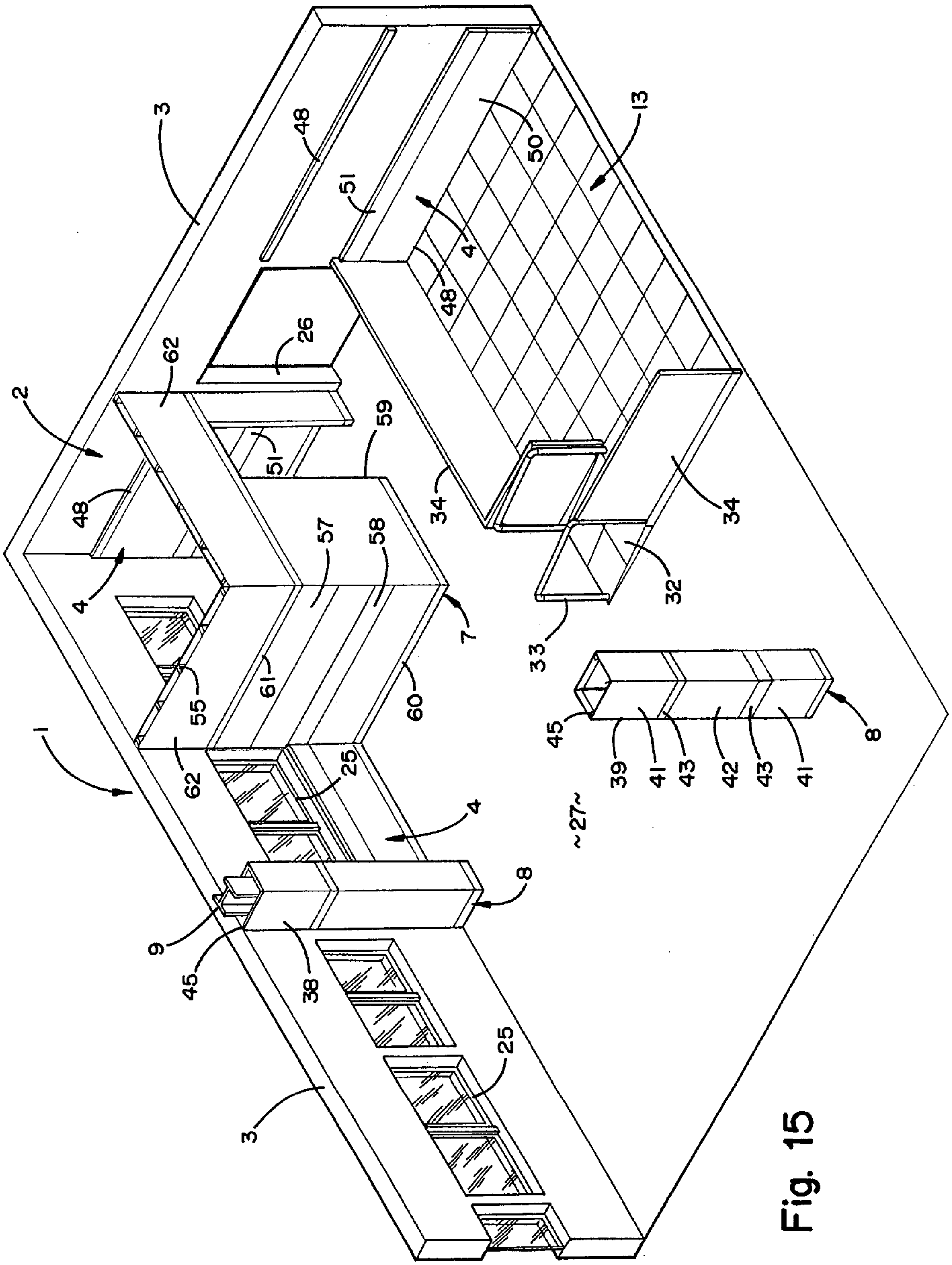
FIG. 15 is a perspective view of the building room and furniture system shown in FIG. 14, and wherein the demountable movable wall system is installed therein.

The illustrated prefabricated wall system 7 (FIG. 15), which is also referred to herein as the Link wall system, is a demountable movable wall system constructed of prefabricated/on-site-assembled components for forming custom width partitions that are compatible with the Plus wall system 4 and the Zone wall system 5. Link wall system 7 includes a plurality of vertical studs 55, adapted to be positioned in a side-by-side relationship. A plurality of horizontal channels 56 are provided in different lengths to facilitate custom fabricating the partitions 54 in different widths. Each beltway channel 56 is shaped to be attached to the studs 55 adjacent standard worksurface height to rigidly interconnect the same in a mutually parallel relationship, and permit the continuous routing of utilities therethrough, along with the belt zone utility troughs 49 on Plus wall system 4, as well as Zone wall system 5. A plurality of cover panels 57 and 58 are detachably mounted on the opposite sides of studs 55 to enclose the same. In the example shown in FIG. 15, the Link wall system 7 has base raceways 60 along the bottom edges of partitions 54, expressway raceways 61 along the top edges of partitions 54, and transoms 62 mounted on top of expressway raceways 61, which extend to the ceiling.

Figure 16:
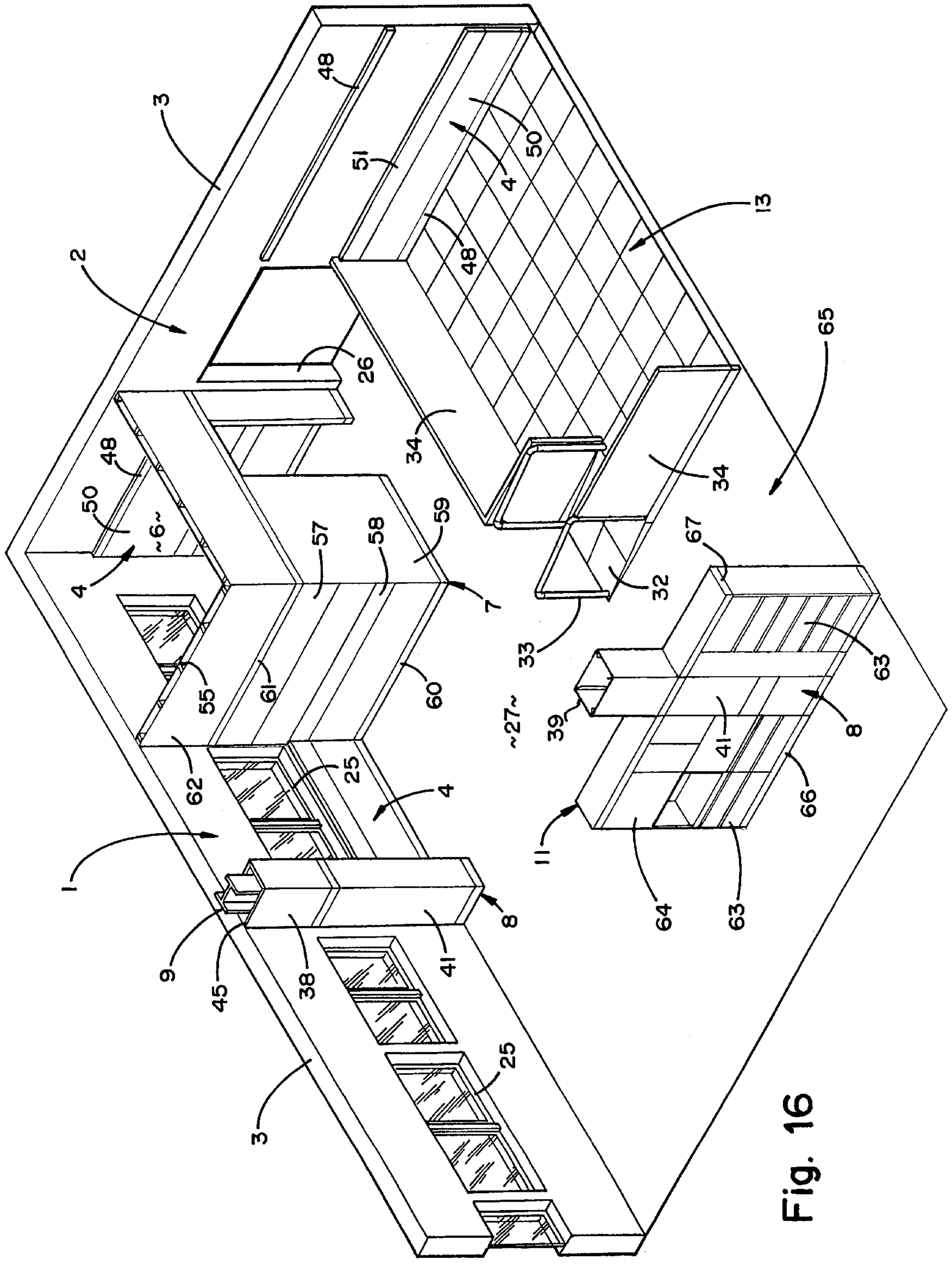
FIG. 16 is a perspective view of the building room and furniture system shown in FIG. 15, and wherein the freestanding storage case system is installed therein.

The illustrated storage wall system 11 (FIG. 16) includes a plurality of modular cases including file cabinets 63 and storage cabinets 64, which are designed to be arranged horizontally in a side-by-side relationship, to create both partial and full partition walls. The front faces of cabinet 63 and 64 can be oriented in either direction, so as to provide access from the desired area of building room 2. In the example illustrated in FIG. 16, file cabinets 63 and storage cabinets 64 are [stacked] above eye level height, and are positioned on opposite sides of the cabinet style column cover 39 to create a wall which defines one of the work settings 6 on one side and an aisle 65 on the opposite side. The illustrated storage wall system 11 h as a powered base 66 and a full expressway raceway 67. Utilities may also be distributed vertically within storage wall system 11.

Figure 17:
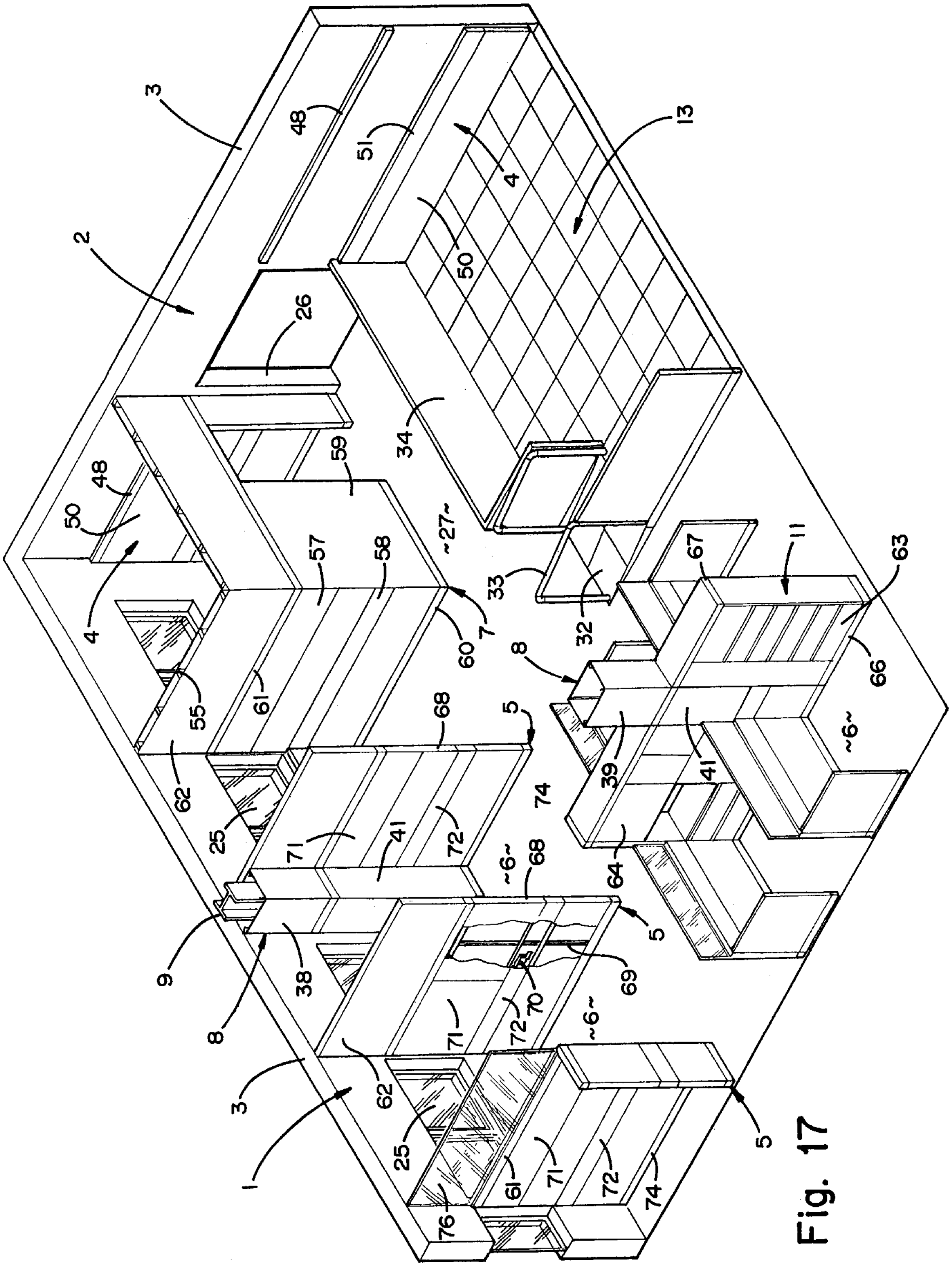
FIG. 17 is a perspective view of the building room and furniture system shown in FIG. 16, and wherein the portable partition wall system is installed therein.

The illustrated prefabricated wall system 5 (FIG. 17), which is also referred to herein as the Zone wall system, is a portable partition system that spatially defines the open plan interior of the building room 2 into individual and group work settings 6. Zone wall system 5, which is disclosed in greater detail in commonly assigned, co-pending U.S. patent application Serial No. 08/367,802, filed Dec. 30, 1994, entitled PORTABLE PARTITION SYSTEM (PATHWAYS-ZONE WALL), which has been incorporated herein, generally includes a plurality of freestanding panels 68 including prefabricated/preassembled/rigid and internally open frames interconnected side-by-side in a predetermined plan configuration. Each Zone wall panel 68 has an internal frame 69, at least some of which includes a horizontally extending utility raceway 70 positioned adjacent worksurface height. A plurality of cover panels 71–72 are provided, each having a horizontally elongated front elevational shape, and being detachably mounted on opposite sides of the frame 69 to enclose the same. In the illustrated examples, Zone wall panels 68 also include base raceways 74 extending along the bottom edges of the panels, and expressway raceways 61 extending along the top edges of the panels, as well as glass transoms 76 and full transoms 62. The full transoms 62 may have hollow interiors through which wires, cables and other utilities can be routed. Vertical drops are provided within the interior of panels 68 to provide power and signal anywhere between base raceway 70 and expressway raceway 61. In general, Zone wall system 5 is a stacking system which begins with a base which provides a low height see-over sitting panel. Stackers are available to provide no see-over sitting, no see-over standing, and above door height configurations. Panels 68 can be provided in different widths to carry additional utilities.

Figure 18:
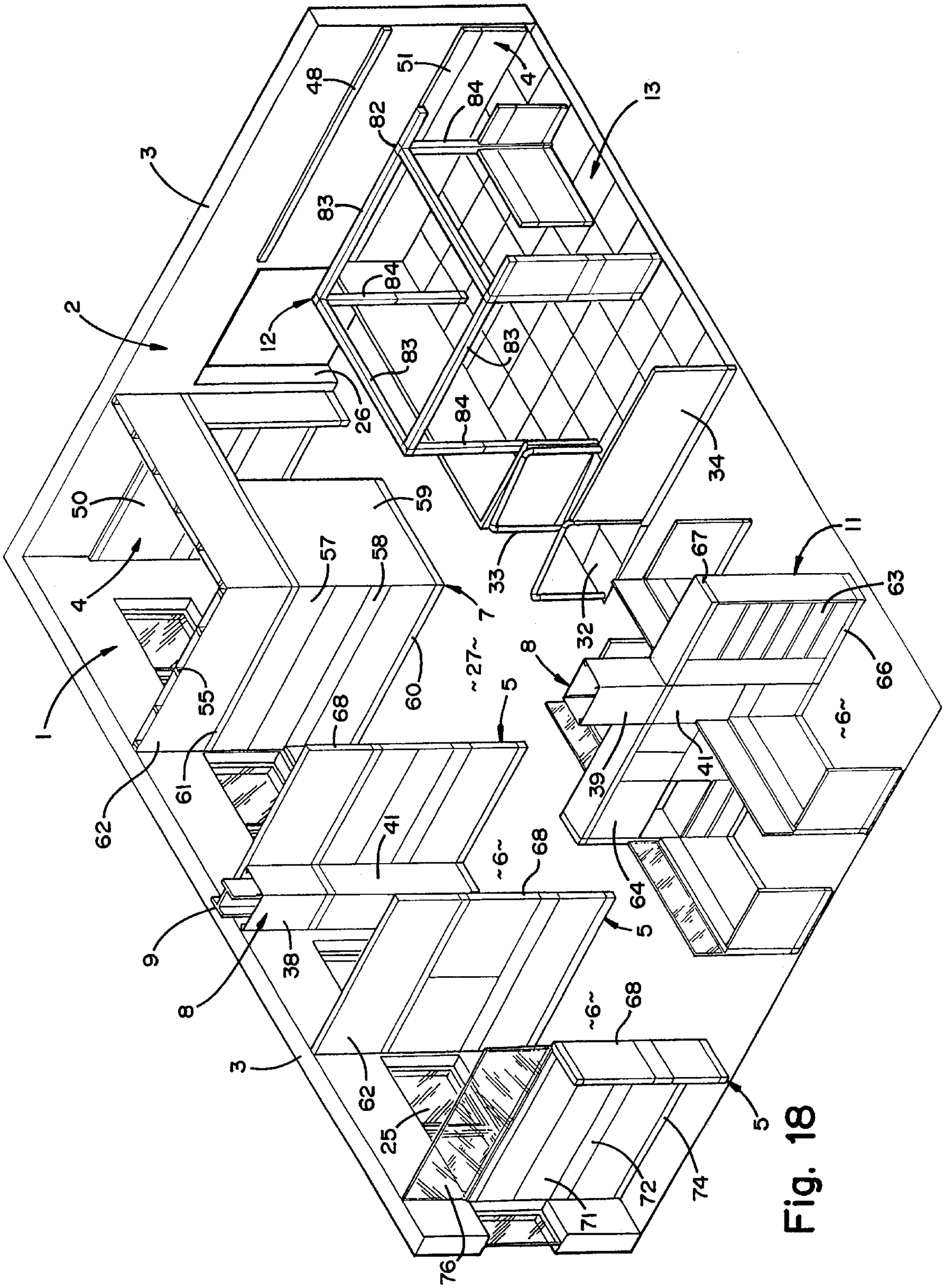
FIG. 18 is a perspective view of the building room and furniture system shown in FIG. 17, and wherein the space frame [prefabricated floor] system is installed therein.

The illustrated space frame system 12 (FIG. 18) is particularly designed to support group work activities in an open portion of the open plan interior of associated building room 2. Space frame system 12 is disclosed in greater detail in commonly assigned, co-pending U.S. patent application Ser. No. 774,563, filed Oct. 8, 1991, entitled FURNITURE SYSTEM ("COMMONS"), and in the illustrated example includes an overhead framework 82, comprising a plurality of frame segments 83 interconnected in an end-to-end fashion to form a rigid structure configured to be positioned above the floor surface 27. Space frame system 12 also includes a plurality of overhead support columns 84, each having an upper portion thereof connected with overhead framework 82, and a lower portion thereof shaped to abut the prefabricated floor system 13. It is to be understood that space frame system 12 can also be supported directly on the floor surface 27 of building room 2. In any event, columns 84 support framework 82 in a freestanding fashion within building room 2 at a predetermined elevation above average user height. Space-frame system 12 also includes a plurality of individual panels 85 which have a lightweight construction to permit easy, manual, bodily translation of the same by an adult user. The panels 85 include connectors 86 that detachably mount the same on overhead framework 82 at various locations therealong in a manner in which panels 85 hang downwardly from overhead support 82 in a generally vertical orientation, and are readily and easily manually removable therefrom and reconfigurable thereon by the user. Panels 85 may include sound attenuation to facilitate partitioning, as well as special exterior surfaces for displays. The horizontal frame segments 83 of framework 82, as well as support columns 84 include utility raceways 87 and 88 associated therewith to facilitate providing utilities to the associated work area. In one example of the present invention, frame segments 83 and support columns 84 have substantially hollow constructions, forming raceways 87 and 88 therein, which are divided to physically separate power and cable wires. In the example illustrated in FIG. 18, space frame system 12 is positioned directly on top of prefabricated floor system 13, and a Zone wall panel 68 extends from the outside pair of support columns 84.

Figure 19:
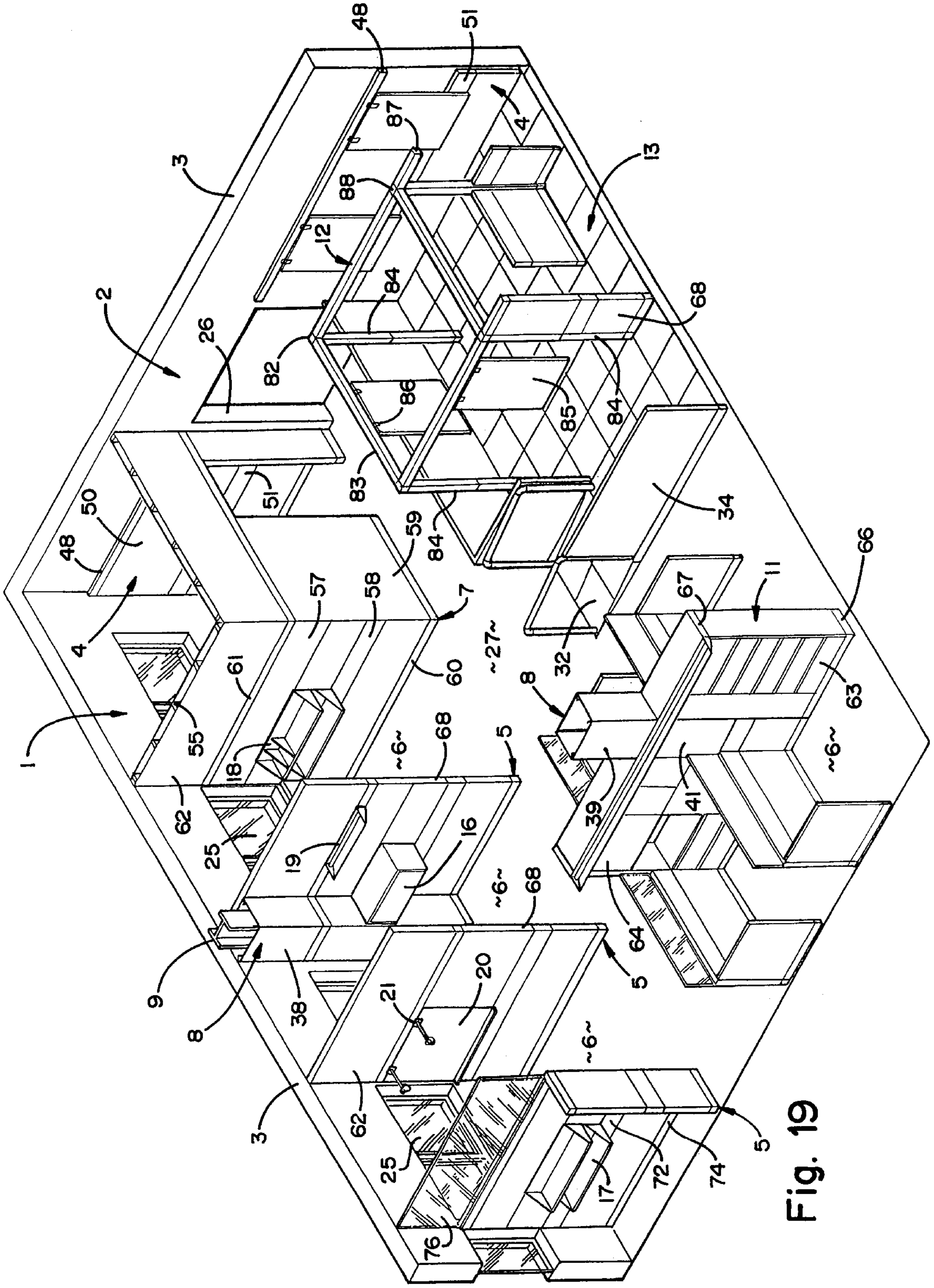
FIG. 19 is a perspective view of the building room and furniture system shown in FIG. 18, and wherein furniture accessories are installed therein.

The illustrated furniture accessories (FIG. 19) are designed to be used anywhere throughout furniture system 1, and are adapted to personalize the individual work settings 6, as well as to provide support for the common work areas, such as at space frame system 12. In the example illustrated in FIG. 19, the furniture accessories include binder bins 16, shelves 17, paper managers 18, task lighting 19, displays 20, and display hooks 21. The furniture accessories 16–21 can be hung from Plus wall system 4, Zone wall system 5, Link wall system 7, and/or column system 8. The panels 85 associated with space frame system 12 can also be hung not only from framework 82, but also from the mounting channels 48 associated with Plus wall system 4, as well as top edges of Link wall system 7 and Zone wall system 5. In this manner, information can be prepared on panels 85 at a convenient location, and then transferred between the various work settings 6 and/or common work area associated with space frame system 12.

Figure 20:
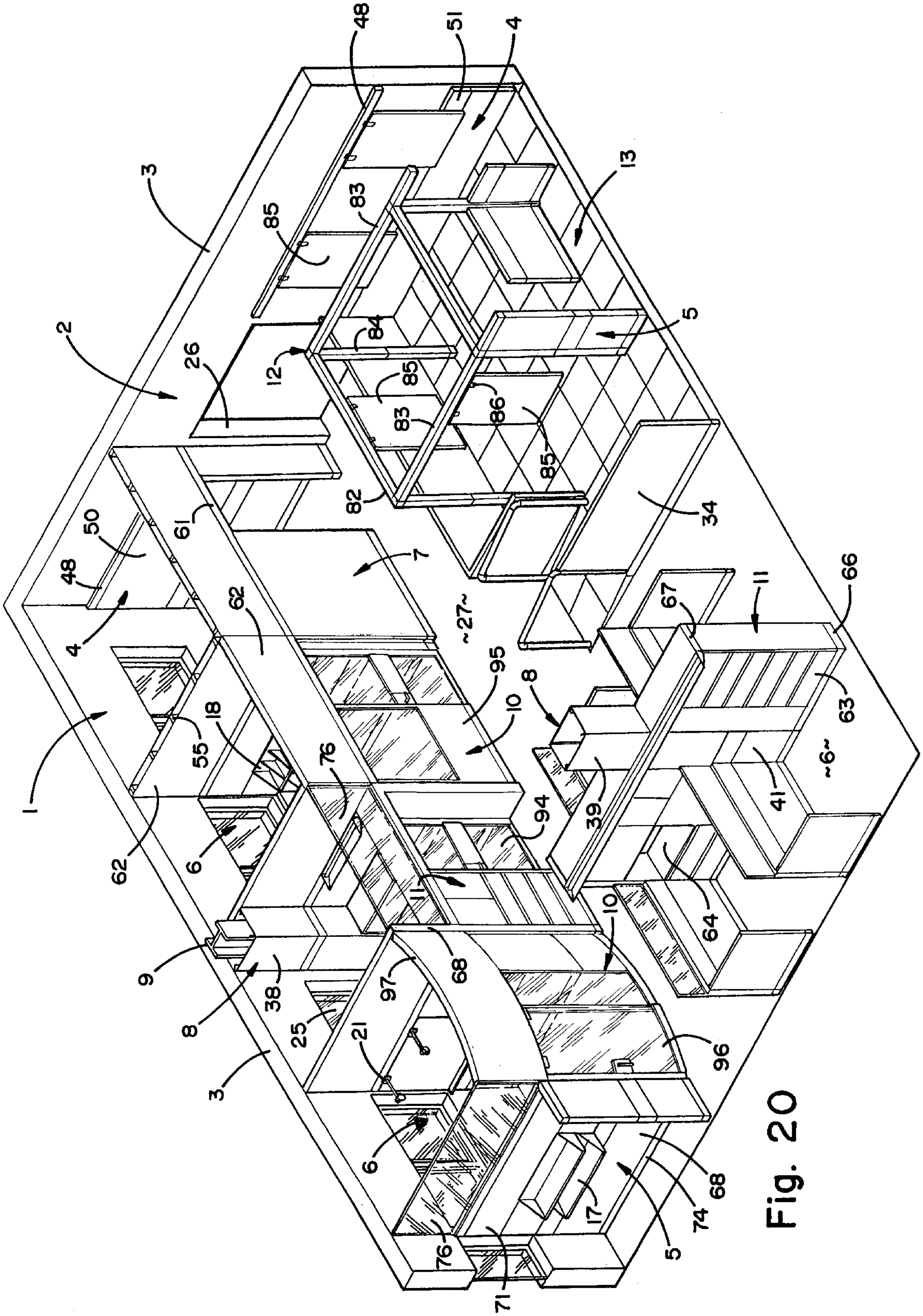
FIG. 20 is a perspective view of the building room and furniture system shown in FIG. 19, and wherein the pre-assembled facade system is installed therein.

The illustrated facade system 10 (FIG. 20) includes a plurality of pre-assembled facade units 92–95 (FIG. 3), each of which includes an entryway, and is adapted for connection with wall systems 4, 5, and 7 to completely enclose a given work setting 6. Facade units 93–95 are all straight facades, and are provided in different widths and configurations to accommodate different interior layouts. Facade unit 96 (FIG. 20) is curved, and includes an arcuate sliding door. In the example illustrated in FIG. 20, facade units 94–96 have a glass transom 76, and full transoms 62 and 97.

Figure 21:
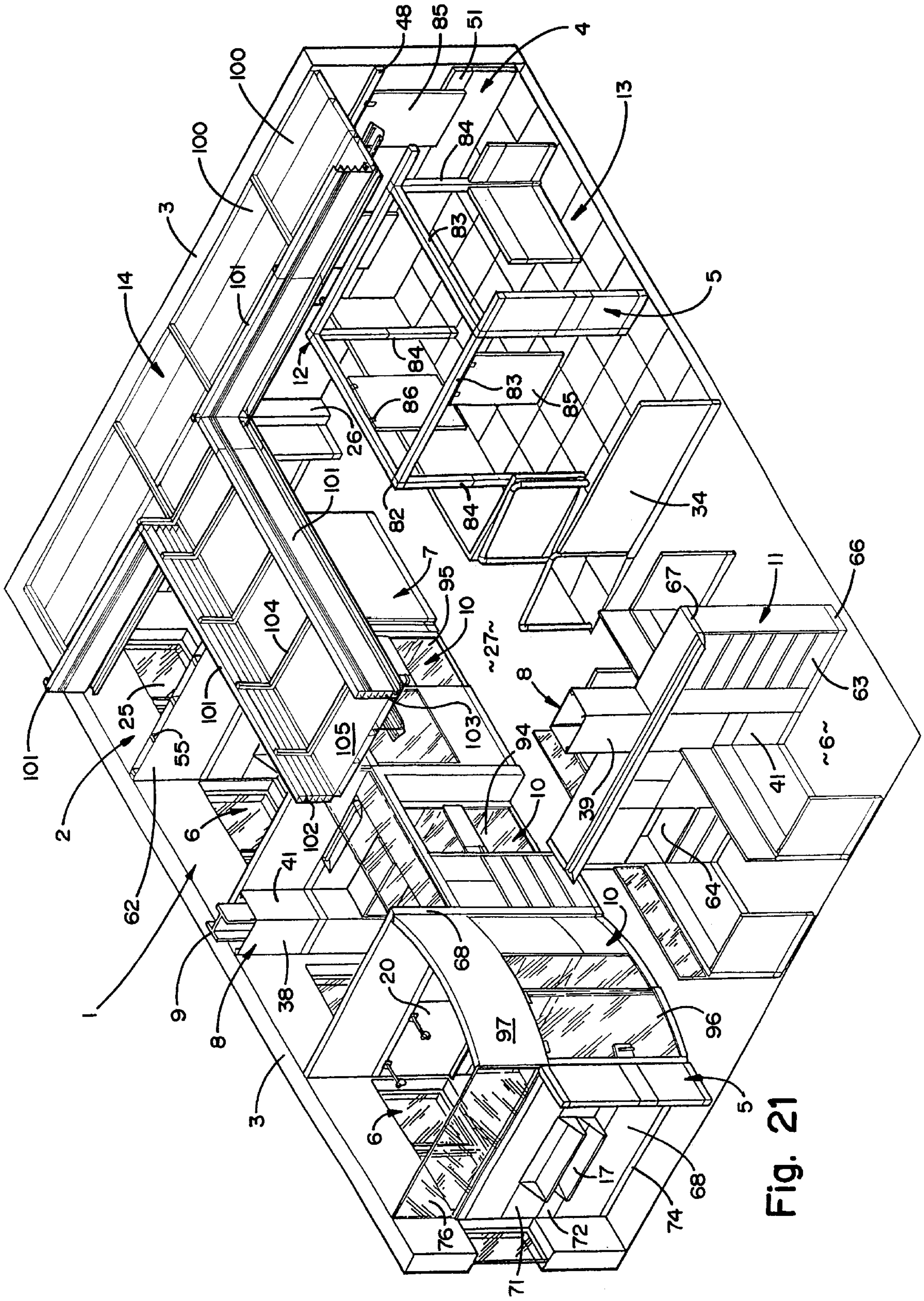
FIG. 21 is a perspective view of the building room and furniture system shown in FIG. 20, and wherein the modular overhead link head system is installed therein.

The illustrated link head system 14 (FIG. 21) is designed for overhead routing of utilities throughout building room 2, and comprises plurality of like link head segments 100, each of which is supported from the structure or ceiling of building room 2, and is mutually interconnected end-to-end to define a continuous housing in which utilities are carried. In the examples illustrated in FIG. 8 and 21, two pairs of link heads 101 are arranged on opposite sides of each link head segment 100 to form two sets of vertically stacked raceways 102 and 103. Each of the link head segments 100 is mounted on an open framework 104, which is in turn suspended from the building structure by adjustable straps or struts. Modular cover panels 105 are mounted on the lower side of framework 104, and extend continuously between the opposite link heads 101, so as to form a U-shaped enclosure through which utility conduits, such as HVAC ducts, sprinkler pipes, power lines, communication lines, etc. can be routed through building room 2. The link heads 101 may include a flat vertically extending common rear wall with a plurality of horizontal flanges extending outwardly therefrom to form the vertically stacked columns of mutually isolated raceways 102 and 103. An accessory hanger channel preferably extends along the lower edge of each link head 101, and is adapted to support a plurality of office accessories thereon, such as lights, motion sensors, etc. Preferably, each of the raceways 102 and 103 is dedicated to a specific type of utility, so that they can be physically separated from one another, and thereby alleviate interference.

The various elements of furniture system 1 are completely compatible and fully integrated in their dimensions, finishes, connections, and utility distribution interface to create a coordinated finished building room 2. For example, the cover panels on Plus wall system 4, Zone wall system 5, and Link wall system 7 may be substantially identical in size and shape to permit the same to be interchanged. As previously noted, these cover panels preferably have a horizontally elongated front elevational shape, which creates a uniform horizontal appearance datum throughout the building room 2. The cover panels are available in common and/or coordinated coverings or finishes. Also, the various raceways associated with wall systems 4, 5, and 7, as well as column cover system 8, facade system 10, and space frame system 12 are preferably provided at common heights, so that they communicate when the units are positioned side-by-side to permit the continuous routing of utilities therethrough. The vertical raceways 44 and 45 in column cover system 8 and 87 and 88 in space frame system 12 are designed to communicate with the horizontal raceways in the remaining elements of the furniture system 1, and particularly assist in transmitting utilities between prefabricated floor system 13 and link head system 14.

Figure 22:
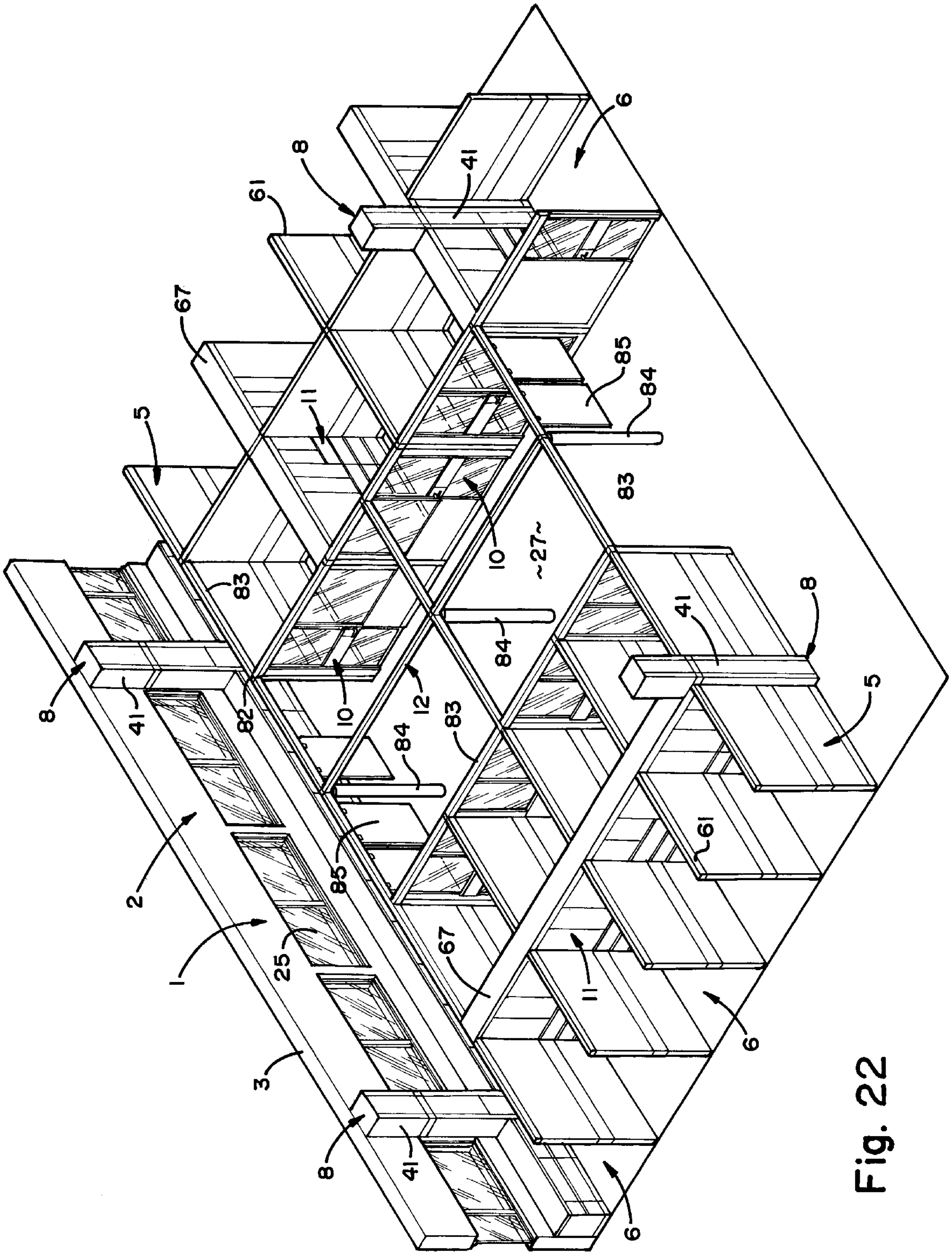
FIG. 22 is a perspective view of another configuration of the present invention, wherein the space frame system is positioned intermediate two groups of workstations or work settings.

FIG. 22 illustrates another arrangement of furniture system 1, wherein the space frame system 12 extends between two sets of workstations 6. The two sets of workstations 6 both include expressway raceways 61 extending along the top edges of the partitioning members, and are located at a height common with the frame segments 83 of space frame framework 82 and the associated raceways 87. Consequently, the space frame framework 82 provides a canopy effect for the common area disposed between the two sets of workstations 6, and also forms conduit to route utilities, support accessories and accept infill between the two sets of workstations 6.

Figure 23:
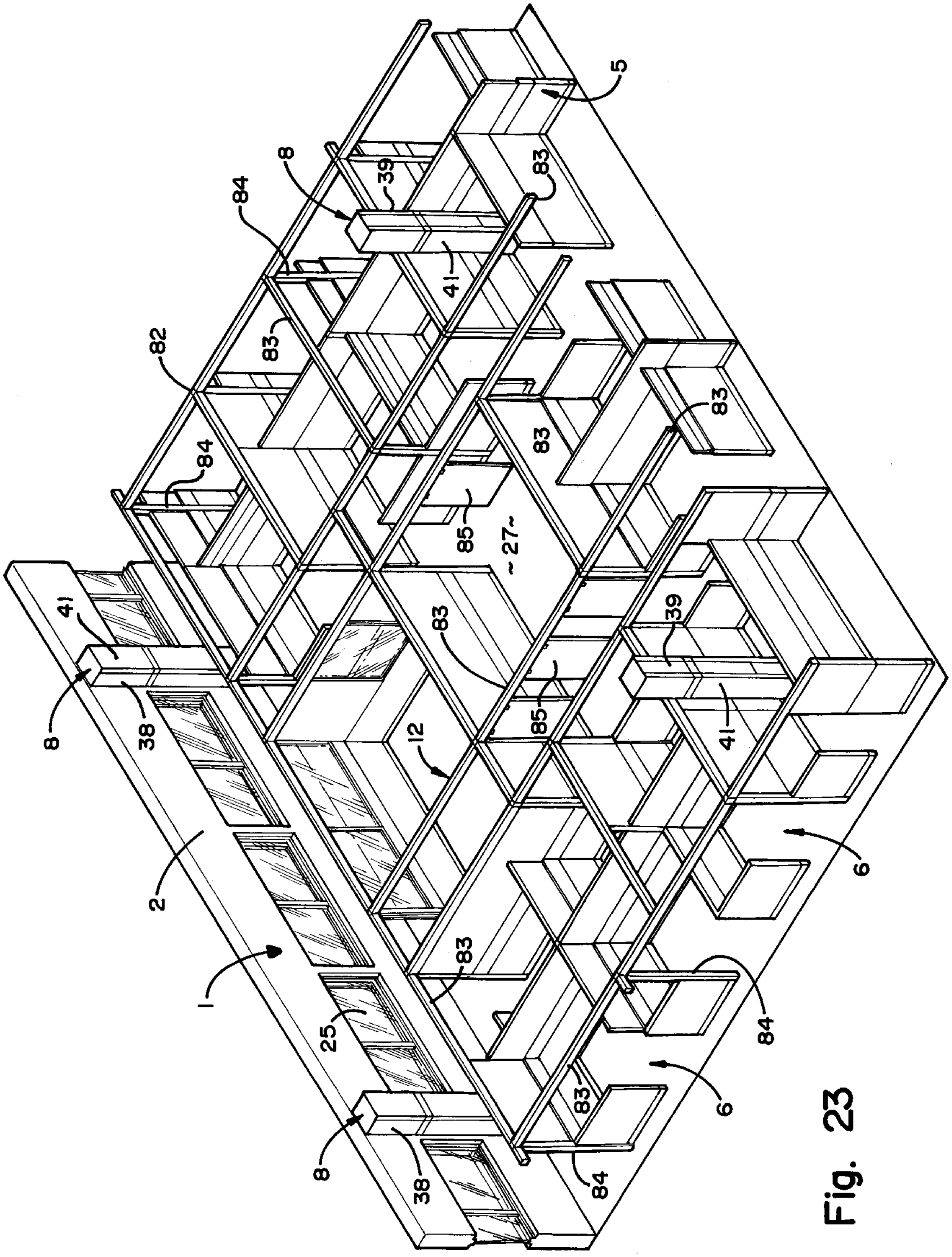
FIG. 23 is a perspective view of yet another configuration of the present invention, wherein the space frame system extends throughout the furniture system.

FIG. 23 illustrates yet another arrangement of furniture system 1, wherein the space frame system 12 forms an overhead link for of each the workstations 6. Utilities can be routed through the raceways 87 in the frame segments 83 of space frame system 12 to provide suitable utilities to the various workstations 6.

Furniture system 1 is an integrated and comprehensive system of space definition and utility distribution products. It spans in function from present modular panel systems to current GWB walls, and surpasses both in terms of utility distribution, level of finish, flexibility, and integration. Furniture system 1 can provide a complete fit-out from the base building shell to the end user—including utilities, finishes, and controls. Furniture system 1 also works within existing or more traditional new construction to provide the level of performance and enclosure required by specific buildings, organizations, and users. Furniture system 1 provides a full range of enclosure and privacy options from screens that wrap around desks, to partial height walls, to completely enclosed private spaces, and completely open post and beam frameworks for collaborative work. It fills all the functions traditionally provided by panels and GWB, while offering more flexibility, more accessories, and greater utility access. Furniture system 1 is based on a horizontal division of walls into zones which allow performance criteria to be added where they will be used with the greatest comfort and efficiency. Utilities are easily accessible, finishes can be varied at different heights (for example: tackboard or white board in upper levels, more durable finishes below . . . ) The horizontal aesthetic also recalls a traditional architectural vocabulary of wainscots, chair rails, and moldings that relates to the proportions of the human body. In furniture system 1, utilities are distributed in three horizontal zones—the kickway at the base, the beltway just above worksurface height and the expressway located just above door height. These provide a variety of utility strategies depending on the height of the installation and the utility requirements. For additional loads, there are optional, add on utility troughs which can be mounted on partial height walls. For areas with low reconfiguration considerations, the interior of the wall can be accessed by removing the skins to provide large amounts of wiring capacity. The transoms can also carry large amounts of wires and some HVAC—and are ideally located for long distance distribution. Furniture system 1 is designed to maximize flexibility—providing access to wires for easy rewiring, the skins are removable and interchangeable, accessories can be used across all the product lines, the stacking frame can be reconfigured with a minimum of wastage. The various cover panels can be removed and replaced in the field giving added access the interior wall for connections and allowing refurbishment of the system without any effect on the frames or utilities. The Linkhead system 14 provides access to building utilities to allow clean changes and minimize downtime. This flexibility is important to respond to the increasing frequency of change in the workplace.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. An integrated prefabricated furniture system for fitting-out a building room of the type having a generally open plan interior, comprising:

a portable partition system for spatially dividing the open plan interior of the building room into a plurality of individual work settings, including:

a plurality of freestanding panels detachably interconnected side-by-side in a predetermined plan configuration and having: prefabricated/preassembled/rigid internal frames, at least some of which define horizontally extending utility raceways adjacent a predetermined worksurface height;

a plurality of cover panels, each having a horizontally elongated front elevational shape, and being detachably attached to opposite sides of said frames to enclose the same; and a demountable moveable wall system constructed of prefabricated/on-site-assembled components for forming custom width partitions compatible with said portable partition system, comprising:

a plurality of vertical channel-supporting members positioned in a side-by-side relationship;

a plurality of beltway channels provided in different lengths to facilitate custom fabricating the partitions in different widths, wherein each is shaped to be attached to said channel-supporting members adjacent the predetermined worksurface height to rigidly interconnect the same in a mutually parallel relationship, and permit continuous routing of utilities therethrough with said utility raceways on said portable partition system; and a plurality of cover panels detachably attached to opposite sides of said channel-supporting members to enclose the same; and said internal frames of said portable partition system including horizontally extending frame members and at least one of said horizontally extending frame members of said portable partition system and said beltway channels of said demountable moveable wall system including a horizontally extending row of slots defining several discrete attachment points that are constructed to releasably support furniture components thereon.

2. A furniture system as set forth in claim 1, wherein:

said utility raceways on said portable partition system and on said demountable moveable wall system have a substantially equal width, and are positioned at a common height to present a uniform horizontal appearance datum throughout the building room, and permit the continuous routing of utilities therethrough.

3. A furniture system as set forth in claim 2, wherein:

said cover panels on said portable panel system and said demountable moveable wall system are substantially identical in size and shape to further reinforce the uniform horizontal appearance datum throughout the building room, and permit the same to be interchanged.

4. A furniture system as set forth in claim 3, including:

a removable column cover system for selectively covering support columns in the associated building room, including:

a plurality of internal frames, each having an openable side for positioning the same generally concentrically about an associated one of the support columns, at least some of which define vertical raceways to route utilities therethrough; and a plurality of cover panels detachably attached to opposite sides of said column cover frames to enclose the same.

5. A furniture system as set forth in claim 4, wherein:

at least some of said column cover frames include a belt zone utility trough positioned at the predetermined worksurface height.

6. A furniture system as set forth in claim 5, including:

a plurality of pre-assembled facades, each having an entryway therein, and adapted for connection with said portable partition system, and said demountable movable wall system.

7. A furniture system as set forth in claim 6, including:

a plurality of pre-assembled freestanding storage cases adapted to be positioned side-by-side to create a partition compatible with said portable partition system, and said demountable movable wall system.

8. A furniture system as set forth in claim 1, including:

a removable column cover system for selectively covering support columns in the associated building room, including:

a plurality of internal frames, each having an openable side for positioning the same generally concentrically about an associated one of the support columns, at least some of which define vertical raceways to route utilities therethrough; and a plurality of cover panels detachably attached to opposite sides of said column cover frames to enclose the same.

9. A furniture system as set forth in claim 1, including:

a plurality of pre-assembled facades, each having an entryway therein, and adapted for connection with said portable partition system, and said demountable movable wall system.

10. A furniture system as set forth in claim 1, including:

a plurality of pre-assembled freestanding storage cases adapted to be positioned side-by-side to create a partition compatible with said said portable partition system, and said demountable movable wall system.

11. A furniture system as set forth in claim 1, including:

a demountable architectural wall system for covering the fixed walls of an associated building room, including:

a plurality of horizontally extending mounting channels for attachment to the fixed walls along upper and lower portions thereof;

a plurality of horizontally extending belt zone utility troughs for attachment to the fixed walls at a position vertically in between the upper and lower portions thereof, adjacent a predetermined worksurface height;

a plurality of cover panels, at least some of which are full width and have a horizontally elongated front elevational shape, and are detachably attached to said mounting channels and said utility troughs to thereby cover the fixed walls.

12. A furniture system as set forth in claim 1, wherein said demountable movable wall system includes structure forming base raceways along a bottom thereof and includes expressway raceways along a top thereof.

13. A furniture system as set forth in claim 12, wherein said demountable movable wall system includes a transom mounted on top of the expressway raceways.

14. A furniture system as set forth in claim 1, wherein sides of said vertical channel-supporting members are notched to receive at least a portion of said beltway channels.

15. A furniture system as set forth in claim 1, wherein said demountable moveable wall system, when covered with said covers panels, emulates a conventional building wall having studs and sheet-type cover panels attached thereto.

16. A furniture system as set forth in claim 1, wherein said demountable moveable wall system includes an end located adjacent and interfaced with one of said freestanding panels.

17. A furniture system as set forth in claim 1, wherein at least one of said freestanding panels of said portable partition system and at least a portion of said demountable moveable wall system are positioned adjacently and interfaced for continuous routing of utilities therethrough.

18. A furniture system as set forth in claim 1 wherein said beltway channels are positioned in notches in a side of said channel-supporting members.

19. A furniture system as set forth in claim 1 wherein said horizontally extending frame members include said slots.

20. A furniture system as set forth in claim 1 wherein said slots are accessible between vertically juxtaposed ones of the cover panels.

21. A furniture system as set forth in claim 1 including brackets with hooks engaging selected ones of said slots and including a partition engaging end supported by said brackets.

22. An integrated prefabricated furniture system for fitting-out a building room of the type having a generally open plan interior, comprising:

a portable partition system for spatially dividing the open plan interior of the building room into a plurality of individual work settings, including:

a plurality of freestanding panels detachably interconnected side-by-side in a predetermined plan configuration and having:

internal frames, at least some of which carry horizontally extending utility raceways adjacent a predetermined worksurface height;

a plurality of cover panels, each having a horizontally elongated front elevational shape, and being detachably attached to opposite sides of said frames to enclose the same; and a demountable moveable wall system forming custom width partitions compatible with said portable partition system, comprising:

a plurality of vertical studs positioned in a side-by-side relationship;

a plurality of beltway channels provided in different lengths to facilitate custom fabricating the partitions in different widths, wherein each is shaped to be attached to said studs adjacent the predetermined worksurface height to rigidly interconnect the same in a mutually parallel relationship, and permit continuous routing of utilities therethrough with said utility raceways on said portable partition system; and a plurality of cover panels detachably attached to opposite sides of said studs to enclose the same;

said utility raceways on said portable partition system and on said demountable moveable wall system having a substantially equal width, and being positioned at a common height to present a uniform horizontal appearance datum throughout the building room, and permit the continuous routing of utilities therethrough;

said cover panels on said portable panel system and said demountable moveable wall system being substantially identical in size and shape to further reinforce the uniform horizontal appearance datum throughout the building room, and permitting the same to be interchanged;

a removable column cover system for selectively covering support columns in the associated building room, including:

a plurality of internal frames, each having an openable side for positioning the same generally concentrically about an associated one of the support columns, at least some of which define vertical raceways to route utilities therethrough; and a plurality of cover panels detachably attached to opposite sides of said column cover frames to enclose the same;

at least some of said column cover frames including a belt zone utility trough positioned at the predetermined worksurface height;

a plurality of pre-assembled facades, each having an entryway therein, and adapted for connection with said portable partition system, and said demountable movable wall system; and a plurality of pre-assembled freestanding storage cases adapted to be positioned side-by-side to create a partition compatible with said portable partition system, and said demountable movable wall system; and a space frame system to support group work activities in an open portion of the open plan interior of the associated building room, including:

an overhead framework comprising a plurality of frame segments interconnected in an end-to-end fashion to form a rigid structure configured to be positioned above the floor surface;

a plurality of overhead support columns, each having an upper portion thereof connected with said overhead framework, and a lower portion thereof shaped to abut the floor surface and thereby support said overhead framework thereon in a freestanding fashion within the building room at a predetermined elevation;

a plurality of individual panels constructed to permit easy, manual, bodily translation of the same by an adult user, and including connectors detachably connecting the same with said overhead framework at various locations therealong in a manner in which said panels hang downwardly from said overhead support in a generally vertical orientation, and are readily and easily manually removable therefrom and reconfigurable thereon by the user; and said internal frames of said portable partition system including horizontally extending frame members and at least one of said horizontally extending frame members of said portable partition system and said beltway channels of said demountable moveable wall system including a horizontally extending row of slots defining several discrete attachment points that are constructed to releasably support furniture components thereon.

23. A furniture system as set forth in claim 22, wherein:

at least some of said freestanding panels in said partition system include an expressway zone utility trough positioned along an upper portion thereof; and a plurality of utility raceways extending along the frame segment of said overhead framework, and communicating with the expressway zone utility troughs on said freestanding panels to provide utilities throughout said furniture system.

24. A furniture system as set forth in claim 23, including:

a prefabricated floor construction adapted to be abuttingly supported on the floor surface of the building room, and including a hollow interior portion thereof defining a raceway to route utility conduits therethrough and a floor surface shaped to support at least one of the work settings thereon.

25. A furniture system as set forth in claim 24, wherein:

said floor raceway communicates with the vertical raceways in said column cover system.

26. A furniture system as set forth in claim 25, wherein:

at least some of said overhead support columns on said space frame system include vertical raceways extending therealong; and said floor raceway communicates with the vertical raceways in said overhead support columns.

27. A furniture system as set forth in claim 26, including:

an overhead link head system for routing utilities throughout the building room, comprising a plurality of link head segments, each being supported from an overhead structure portion of the building room, and mutually interconnected end-to-end to define a continuous housing through which utilities are routed and distributed.

28. A furniture system as set forth in claim 27, including:

a plurality of furniture accessories for supporting the work settings, and including connectors for interchangeable hanging of the same from said portable partition system, said demountable moveable wall system and said space frame system.

29. An integrated prefabricated furniture system for fitting-out a building room of the type having a generally open plan interior, comprising:

a portable partition system for spatially dividing the open plan interior of the building room into a plurality of individual work settings, including:

a plurality of freestanding panels detachably interconnected side-by-side in a predetermined plan configuration and having:

internal frames, at least some of which carry horizontally extending utility raceways adjacent a predetermined worksurface height;

a plurality of cover panels, each having a horizontally elongated front elevational shape, and being detachably attached to opposite sides of said frames to enclose the same; and a demountable moveable wall system forming custom width partitions compatible with said portable partition system, comprising:

a plurality of vertical studs positioned in a side-by-side relationship;

a plurality of beltway channels provided in different lengths to facilitate custom fabricating the partitions in different widths, wherein each is shaped to be attached to said studs adjacent the predetermined worksurface height to rigidly interconnect the same in a mutually parallel relationship, and permit continuous routing of utilities therethrough with said utility raceways on said portable partition system; and a plurality of cover panels detachably attached to opposite sides of said studs to enclose the same; and a space frame system to support group work activities in an open portion of the open plan interior of the associated building room, including:

an overhead framework comprising a plurality of frame segments interconnected in an end-to-end fashion to form a rigid structure configured to be positioned above the floor surface;

a plurality of overhead support columns, each having an upper portion thereof connected with said overhead framework, and a lower portion thereof shaped to abut the floor surface and thereby support said overhead framework thereon in a freestanding fashion within the building room at a predetermined elevation;

a plurality of individual panels constructed to permit easy, manual, bodily translation of the same by an adult user, and including connectors detachably connecting the same with said overhead framework at various locations therealong in a manner in which said panels hang downwardly from said overhead support in a generally vertical orientation, and are readily and easily manually removable therefrom and reconfigurable thereon by the user; and said internal frames of said portable partition system including horizontally extending frame members and at least one of said horizontally extending frame members of said portable partition system and said beltway channels of said demountable moveable wall system including a horizontally extending row of slots defining several discrete attachment points that are constructed to releasably support furniture components thereon.

30. An integrated prefabricated furniture system for fitting-out a building room of the type having a generally open plan interior, comprising:

a portable partition system for spatially dividing the open plan interior of the building room into a plurality of individual work settings, including:

a plurality of freestanding panels detachably interconnected side-by-side in a predetermined plan configuration and having:

internal frames, at least some of which carry horizontally extending utility raceways adjacent a predetermined worksurface height;

a plurality of cover panels, each having a horizontally elongated front elevational shape, and being detachably attached to opposite sides of said frames to enclose the same; and a demountable moveable wall system forming custom width partitions compatible with said portable partition system, comprising:

a plurality of vertical studs positioned in a side-by-side relationship;

a plurality of beltway channels provided in different lengths to facilitate custom fabricating the partitions in different widths, wherein each is shaped to be attached to said studs adjacent the predetermined worksurface height to rigidly interconnect the same in a mutually parallel relationship, and permit continuous routing of utilities therethrough with said utility raceways on said portable partition system; and a plurality of cover panels detachably attached to opposite sides of said studs to enclose the same; and a prefabricated floor construction adapted to be abuttingly supported on the floor surface of the building room, and including a hollow interior portion thereof defining a raceway to route utility conduits therethrough and a floor surface shaped to support at least one of the work settings thereon; and said internal frames of said portable partition system including horizontally extending frame members and at least one of said horizontally extending frame members of said portable partition system and said beltway channels of said demountable moveable wall system including a horizontally extending row of slots defining several discrete attachment points that are constructed to releasably support furniture components thereon.

31. An integrated prefabricated furniture system for fitting-out a building room of the type having a generally open plan interior, comprising:

a portable partition system for spatially dividing the open plan interior of the building room into a plurality of individual work settings, including:

a plurality of freestanding panels detachably interconnected side-by-side in a predetermined plan configuration and having:

internal frames, at least some of which carry horizontally extending utility raceways adjacent a predetermined worksurface height;

a plurality of cover panels, each having a horizontally elongated front elevational shape, and being detachably attached to opposite sides of said frames to enclose the same; and a demountable moveable wall system forming custom width partitions compatible with said portable partition system, comprising:

a plurality of vertical studs positioned in a side-by-side relationship;

a plurality of beltway channels provided in different lengths to facilitate custom fabricating the partitions in different widths, wherein each is shaped to be attached to said studs adjacent the predetermined worksurface height to rigidly interconnect the same in a mutually parallel relationship, and permit continuous routing of utilities therethrough with said utility raceways on said portable partition system; and a plurality of cover panels detachably attached to opposite sides of said studs to enclose the same;

an overhead link head system for routing utilities throughout the building room, comprising a plurality of link head segments, each being supported from an overhead structure portion of the building room, and mutually interconnected end-to-end to define a continuous housing through which utilities are routed and distributed; and said internal frames of said portable partition system including horizontally extending frame members and at least one of said horizontally extending frame members of said portable partition system and said beltway channels of said demountable moveable wall system including a horizontally extending row of slots defining several discrete attachment points that are constructed to releasably support furniture components thereon.

32. An integrated prefabricated furniture system for fitting-out a building room of the type having a generally open plan interior, comprising:

a portable partition system for spatially dividing the open plan interior of the building room into a plurality of individual work settings, including:

a plurality of freestanding panels detachably interconnected side-by-side in a predetermined plan configuration and having:

internal frames, at least some of which carry horizontally extending utility raceways adjacent a predetermined worksurface height;

a plurality of cover panels, each having a horizontally elongated front elevational shape, and being detachably attached to opposite sides of said frames to enclose the same; and a demountable moveable wall system forming custom width partitions compatible with said portable partition system, comprising:

a plurality of vertical studs positioned in a side-by-side relationship;

a plurality of beltway channels provided in different lengths to facilitate custom fabricating the partitions in different widths, wherein each is shaped to be attached to said studs adjacent the predetermined worksurface height to rigidly interconnect the same in a mutually parallel relationship, and permit continuous routing of utilities therethrough with said utility raceways on said portable partition system; and a plurality of cover panels detachably attached to opposite sides of said studs to enclose the same;

a plurality of furniture accessories for supporting the work settings, and including connectors for interchangeable hanging of the same from said portable partition system and said demountable moveable wall system; and said internal frames of said portable partition system including horizontally extending frame members and at least one of said horizontally extending frame members of said portable partition system and said beltway channels of said demountable moveable wall system including a horizontally extending row of slots defining several discrete attachment points that are constructed to releasably support furniture components thereon.

33. A furniture system as set forth in claim 32 wherein said horizontally extending frame members include said slots.

34. A furniture system as set forth in claim 32 wherein said slots are accessible between vertically juxtaposed ones of the cover panels.

35. A furniture system as set forth in claim 32 including brackets with horizontally facing hooks engaging selected ones of said slots and including a partition engaging and supported by said brackets.

* * * * *